United States Patent [19]
Bedford

[11] Patent Number: 6,085,894
[45] Date of Patent: Jul. 11, 2000

[54] CONVEYOR SYSTEM

[76] Inventor: Lee Alvin Bedford, 317 Spruce Ave., Dumas, Tex. 79029

[21] Appl. No.: 09/012,941

[22] Filed: Jan. 24, 1998

[51] Int. Cl.⁷ .................................................. B65G 25/00
[52] U.S. Cl. ........................... 198/741; 198/747; 198/738
[58] Field of Search .................................... 198/722, 732, 198/738, 741, 743, 746, 747, 468.9, 468.11

[56] References Cited

U.S. PATENT DOCUMENTS

| | | | |
|---|---|---|---|
| 3,589,534 | 6/1971 | Brown | 198/747 X |
| 3,826,347 | 7/1974 | Kosnylak | 198/738 X |
| 4,068,957 | 1/1978 | Brems et al. | 198/741 X |
| 5,184,711 | 2/1993 | Zambelli | 198/741 X |

*Primary Examiner*—James R. Bidwell

[57] ABSTRACT

The present invention, in certain embodiments, is an apparatus for the movement of objects on rollers. The apparatus comprises a frame element, a series of rollers, a rotating pipe element suspended over the series of rollers, at least one push-arm assembly connected to the rotating pipe element, and a drive apparatus to actuate the rotating pipe element. The series of rollers are mounted in the frame element such that each roller in the series of rollers rotates within the frame element so that the objects resting on the series of rollers may travel from a first end of the series of rollers to a second terminal end of the series of rollers. The rotating pipe element is suspended over the series of rollers, and the rotating pipe element pivots along a longitudinal axis and is driven at one end. The drive apparatus actuates the rotating pipe element, thereby moving the at least one push-arm assembly to a position in contact with at least one of the objects to move along the series of rollers.

22 Claims, 9 Drawing Sheets

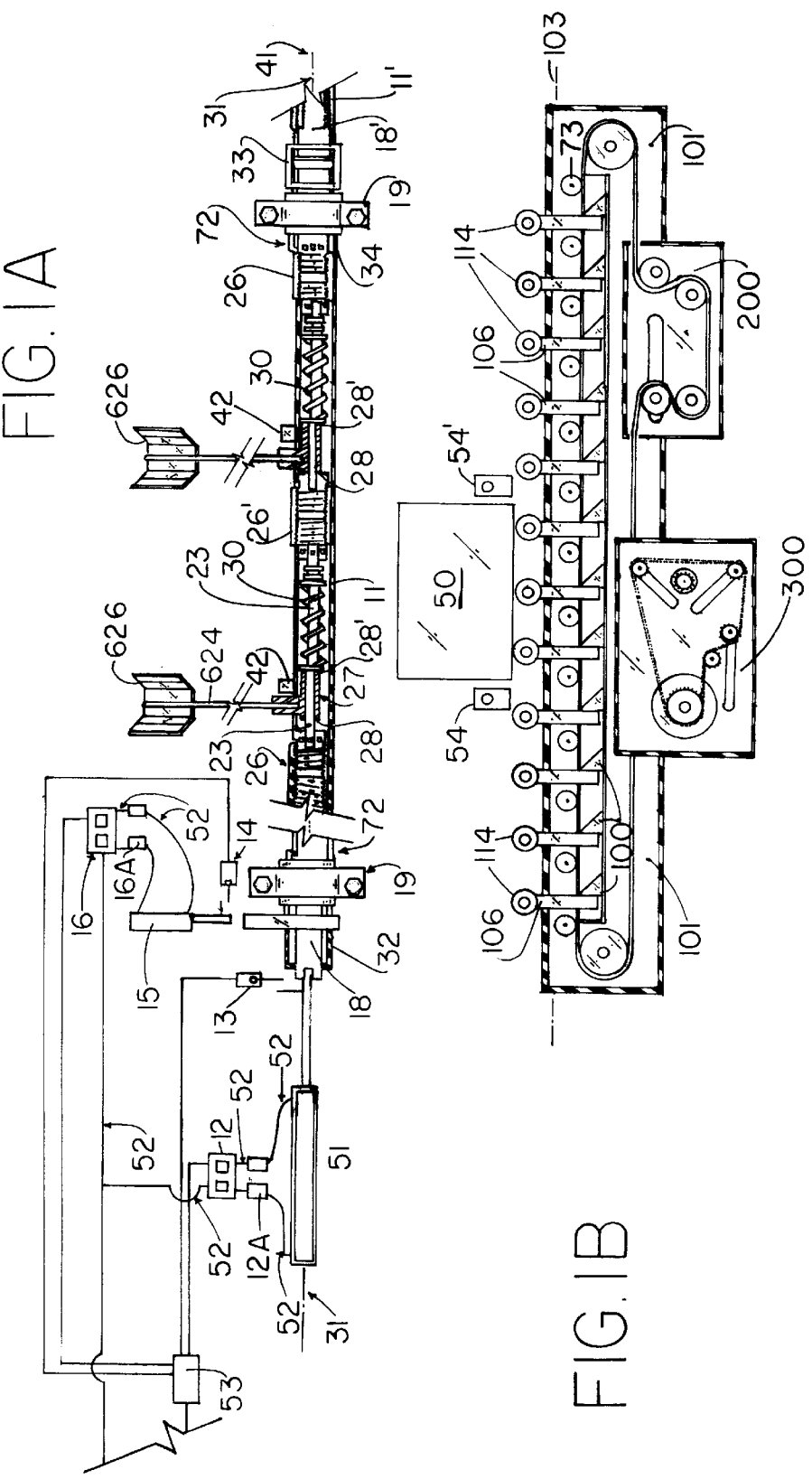

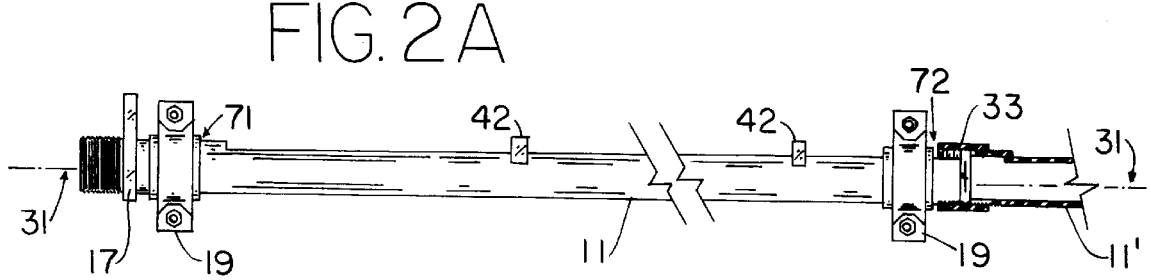
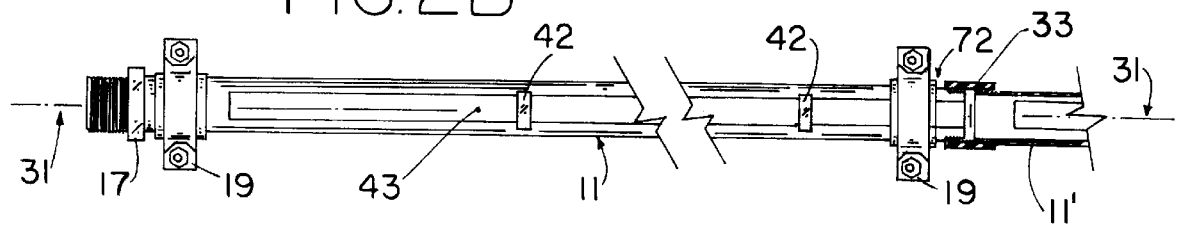
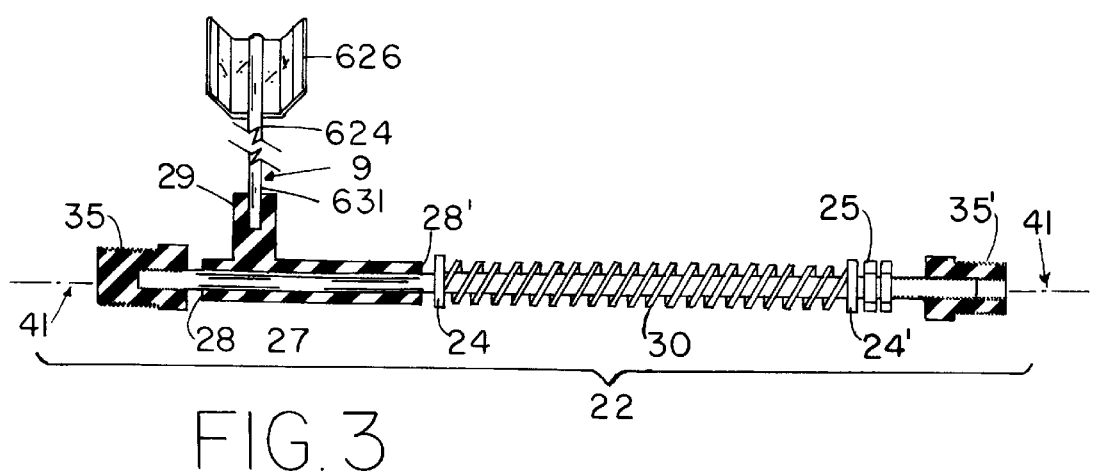

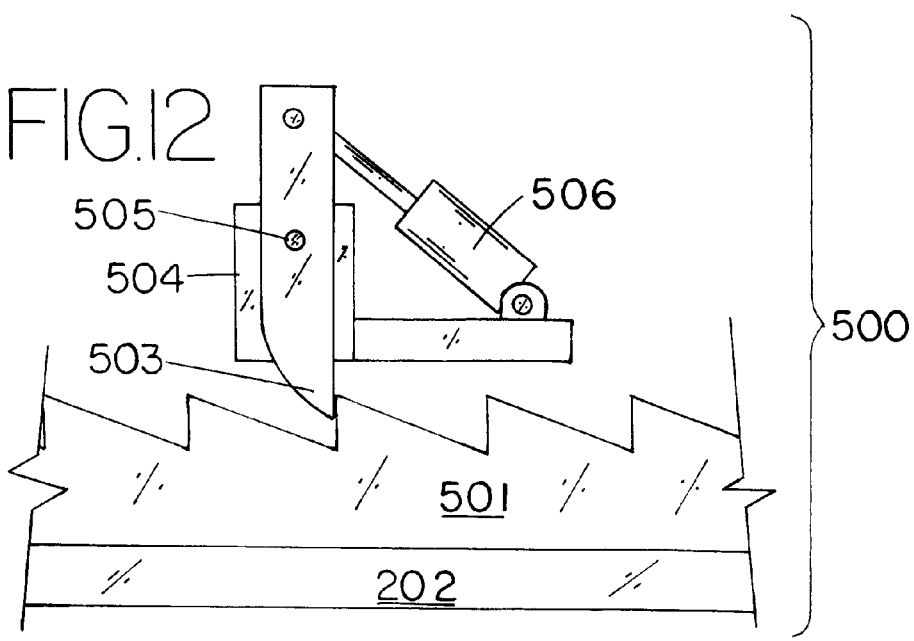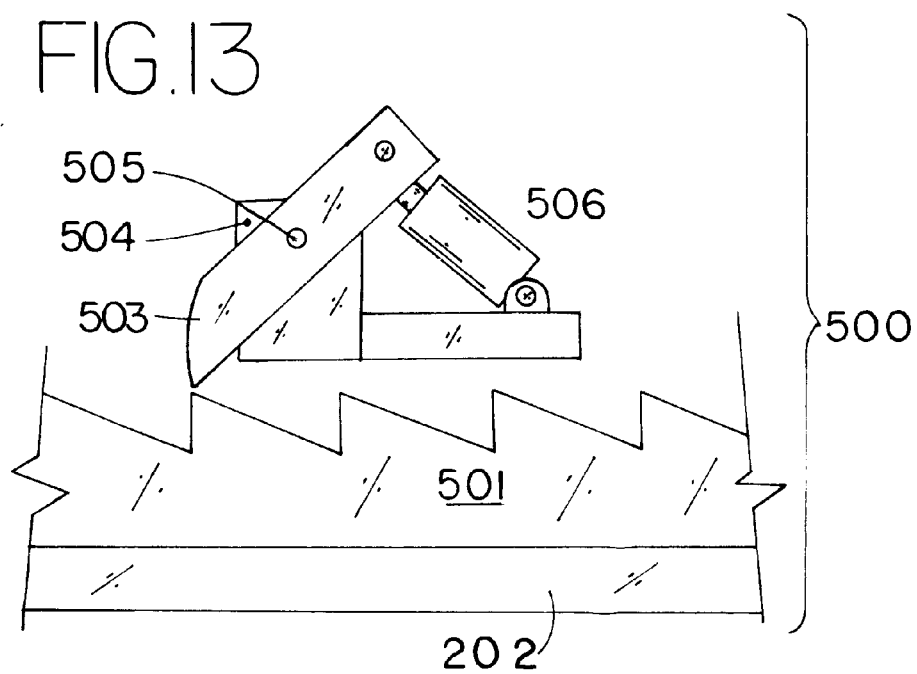

CONVEYOR SYSTEM

1. FIELD OF THE INVENTION

The present invention pertains to conveying systems, and in one aspect to such systems for conveying industrial boxes or packages.

2. DESCRIPTION OF THE PRIOR ART

Conveyor systems are commonly used in industrial operations. Generally, a box is placed on either a belt-driven series of rollers, or a series of low-friction rollers without mechanical drive means. Whether the boxes placed on the conveyor are moved either by mechanical means or the inertia of the box in motion on the rollers, it is a commonplace occurrence that movement of the boxes on the conveyor stalls due to mechanical failure of one or more conveyors. Because interrupted movement of the boxes adversely affects productivity, it is important that boxes on the conveyor move smoothly and consistently.

Malfunctioning conveyors cause boxes or other articles or other objects to not to move along the rollers of the conveyor system in a regular, consistent procession. Boxes are loaded on a conveyor either manually or mechanically, and boxes at the end of the conveyor are loaded on pallets for further packaging for shipment. The rate at which boxes may be loaded onto or unloaded from a conveyor system varies. Because of the varied loading upon the conveyor, the movement of each object or box along the rollers on the conveyors varies. Differences in the energy or speed each box has along the rollers affects whether there is a collision of the boxes on the conveyor; if a box snags, stalls or rotates on the conveyors due to differential motion, uneven friction on the rollers, or other interference with the path of travel of a box on the conveyor, the regularity of the rate of movement or the distance between the boxes is adversely affected and delays or inconsistencies in productivity occur.

Currently this problem is not satisfactorily addressed. Generally, when a stoppage occurs on a conveyor due to a malfunction, the conveyor and all the conveyors preceding the conveyor on a particular line are halted until the cause of the failure is repaired. Unfortunately, this is a waste of productivity in operations and unnecessarily exposes employees to the danger of having clothes snag or body parts be caught in the machinery, and therefore, injury. Until this invention, there had been no safer alternative to today's labor-intensive, productivity-draining conveyor means.

3. SUMMARY OF THE INVENTION

The present invention, in certain aspects, solves the problem of irregular procession or jamming of a number of boxes along a conveyor. The solution presented by this invention employs one or more push-arm assemblies which, when activated, move to engage and push boxes or other objects on a conveyor. This invention also has mechanisms which, upon a series of jams on the conveyor, which are detected by various sensing apparatuses, disengages the drive belt or the drive chain, or both, to prevent the conveyor from moving even more objects or boxes on the conveyor to the area of the jam. Additionally, this invention employs a series of wheeled lift-cam apparatuses, which when activated, protrude through the rollers of the conveyor to lift, enhance, and resume movement of the boxes or other objects on the conveyor.

This invention is an improved conveyor system for moving objects along a series of rollers. In one aspect, such a system includes: (1) at least one rotating pipe, which pivots along its longitudinal axis, which rotating pipe is driven at one end by a pivot yoke, which is, in turn driven by a pivot cylinder; (2) a series of push-arm assemblies, each push-arm assembly includes a collapsible arm, which collapsible arm is attached to a spring-loaded element and a position-securing element within the protruding end of an r-shaped joint, wherein the collinear ends of the reshaped joint surround a portion of a box-pulling shaft, and which box-pulling shaft has a longitudinal axis which is collinear with the longitudinal axis of the rotating pipe, at the end of which box-pulling shaft is a steel collar for attaching one or more other box-pulling shafts; (3) a drive apparatus for rotating the pivot yoke for actuating the rotating pipe and push-arm assemblies, wherein the drive apparatus further includes a control apparatus, for regulating the flow of boxes along the series of rollers, and a ram cylinder which engages the box-pulling shaft for the purpose of moving the boxes along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, and a drive apparatus to actuate the rotating pipe element, thereby moving the at least one push-arm assembly to a position in contact with at least one of the objects to move the at least one of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, a drive apparatus to actuate the rotating pipe element, thereby moving the at least one push-arm assembly to a position in contact with at least one of the objects to move the at least one of the objects along the series of rollers, a pivot yoke attached to the one end of the rotating pipe, and a pivot cylinder integrated in a driving relationship with the pivot yoke wherein the drive apparatus drives the pivot cylinder and drives the pivot yoke to actuate the rotating pipe element, thereby moving the at least one push-arm assembly to a position in contact with at least one of the objects to move the at least one of the objects.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, the at least one push-arm assembly having a collapsible arm attached to the rotating pipe element, and a drive apparatus to actuate the rotating pipe element, thereby moving the at least one push-arm assembly to a position in contact with at least one of the objects to move the at least one of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, the at least one push-arm assembly having a spring-loaded element attached to the rotating pipe element and a collapsible arm attached to a spring-loaded element, and a drive apparatus to actuate the rotating pipe element, thereby moving the at least one push-arm assembly to a position in contact with at least one of the objects to move the at least one of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly having a spring-loaded element attached to the rotating pipe element, a position-securing element being attached to the rotating pipe element, and a collapsible arm attached to the spring-loaded element and to the position-securing element, the at least one push-arm assembly connected to the rotating pipe element, and a drive apparatus to actuate the rotating pipe element, thereby moving the at least one push-arm assembly to a position in contact with at least one of the objects to move the at least one of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly having a spring-loaded element attached to the rotating pipe element, a position-securing element being attached to the rotating pipe element, and a collapsible arm attached to the spring-loaded element and to the position-securing element the spring loaded element and the position securing element disposed within a protruding end of an r-shaped joint element, the r-shaped joint element attached to the rotating pipe element, the at least one push-arm assembly connected to the rotating pipe element, and a drive apparatus to actuate the rotating pipe element, thereby moving the at least one push-arm assembly to a position in contact with at least one of the objects to move the at least one of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, the at least one push-arm assembly having a collapsible arm with an end, an arm mount plate with a base, a first end, and a second end, where the first end of the arm mount plate is attached to the end of the collapsible arm, and where the base extends into and slides along a path parallel to the longitudinal axis of the rotating pipe element within the rotating pipe element, at least one gear with teeth which rotates on an axle, which axle is attached to second end of the arm mount plate, and a notched track with an end and a plurality of gear-teeth-receiving elements for engaging the teeth of the at least one gear and wherein the end of the track is attached to the rotating pipe element, and a drive apparatus to actuate the rotating pipe element, thereby moving the at least one push-arm assembly to a position in contact with at least one of the objects to move the at least one of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, a box-pulling shaft, with an end, contained within and attached to the rotating pipe element, at least one push-arm assembly connected to the rotating pipe element, and a drive apparatus to actuate the rotating pipe element, thereby moving the at least one push-arm assembly to a position in contact with at least one of the objects to move the at least one of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, a box-pulling shaft, with an end, contained within and attached to the rotating pipe element, at least one push-arm assembly having a spring-loaded element attached to the rotating pipe element, a position-securing element being attached to the rotating pipe element, and a collapsible arm attached to the spring-loaded element and to the position-securing element within the protruding end of an r-shaped joint element with collinear ends, wherein the collinear ends of the r-shaped joint element surround the box-pulling shaft, the at least one push-arm assembly connected to the rotating pipe element, and a drive apparatus to actuate the rotating pipe element, thereby moving the at least one push-arm assembly to a position in contact with at least one of the objects to move the at least one of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, a box-pulling shaft, with an end, contained within and attached to the rotating pipe element, and having a longitudinal axis collinear with the longitudinal axis of the rotating pipe element at least one push-arm assembly connected to the rotating pipe element, and a drive apparatus to actuate the rotating pipe element, thereby moving the at least one push-arm assembly to a position in contact with at least one of the objects to move the at least one of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, a box-pulling shaft, with an end, contained within and attached to the rotating pipe element, with the box-pulling shaft having a longitudinal axis collinear with the longitudinal axis of the rotating pipe element at least one push-arm assembly connected to the rotating pipe element, and with the box pulling shaft having a steel collar attached to the end of the box-pulling shaft the steel collar attachable to additional box-pulling shafts, and a drive apparatus to actuate the rotating pipe element, thereby moving the at least one push-arm assembly to a position in contact with at least one of the objects to move the at least one of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, and a drive apparatus, which includes a control apparatus for regulating a flow of objects along the series of rollers, to actuate the rotating pipe element, thereby moving the at least one push-arm assembly to a position in contact with at least one of the objects to move the at least one of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, and a drive apparatus, which includes a ram cylinder attached to a union element attached to the box-pulling shaft, to actuate the rotating pipe element, thereby moving the at least one push-arm assembly to a position in contact with at least one of the objects to move the at least one of the objects along the series of rollers.

The invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, a drive apparatus to actuate the rotating pipe element, thereby moving the at least one push-arm assembly to a position in contact with at least one of the objects to move the at least one of the objects along the series of rollers, a generally planar outer framework attached to the frame element, an inner framework located inside the generally planar outer framework, at least one lift roller having an arm with at least one side, a top and a bottom, wherein the bottom of the arm is attached to the inner framework, and at least one wheel is attached to the top of the arm, at least one wedge-shaped roller lift cam, with a side and a base, the base of the at least one wedge-shaped roller lift cam attached to the generally planar outer framework, wherein the at least one side of the at least one lift roller slides along the side of the at least one wedge-shaped roller lift cam, and a drive apparatus to move the inner framework, thereby moving the at least one side of the at least one lift roller along the side of the at least one wedge-shaped roller lift cam so that the wheel located at the top of the at least one lift roller protrudes through the series of rollers to a position in contact with the at least one of the objects.

The invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, a drive apparatus to actuate the rotating pipe element, thereby moving the at least one push-arm assembly to a position in contact with at least one of the objects to move the at least one of the objects along the series of rollers, a generally planar outer framework attached to the frame element, an inner framework located inside the generally planar outer framework, at least one lift roller having an arm with at least one side, a top and a bottom, wherein the bottom of the arm is attached to the inner framework, and at least one wheel is attached to the top of the arm, at least one wedge-shaped roller lift cam, with a side and a base, the base of the at least one wedge-shaped roller lift cam attached to the generally planar outer framework, wherein the at least one side of the at least one lift roller slides along the side of the at least one wedge-shaped roller lift cam, a drive apparatus to move the inner framework, thereby moving the at least one side of the at least one lift roller along the side of the at least one wedge-shaped roller lift cam so that the wheel located at the top of the at least one lift roller protrudes through the series of rollers to a position in contact with the at least one of the objects, and a brake having a housing attached to the inner framework, a ratchet arm with a top, a bottom, and a pivot, rotatably mounted by the pivot within the housing, a toothed rack which lockingly engages the bottom of the ratchet arm and is attached to the generally planar outer framework, and an apparatus attached to the top of the ratchet arm to move the ratchet arm around the pivot of the ratchet arm thereby moving the bottom of the ratchet arm from an initial position whereby the bottom of the ratchet arm lockingly engages the toothed rack to a second position whereby the bottom of the ratchet arm disengages the toothed rack.

The invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, a drive apparatus to actuate the rotating pipe element, thereby moving the at least one push-arm assembly to a position in contact with at least one of the objects to move the at least one of the objects along the series of rollers, and a framework with a drive belt entrance, a drive belt exit, and at least one slot, the framework being attached to the frame element, a drive belt, which engages the series of rollers and enters the framework through the drive belt entrance and exits the framework through the drive belt exit, at least one roller mounted in the at least one slot, and a drive apparatus with an end attached to the at least one roller to move the at least one roller along the at least one slot within the framework to engage the drive belt from an initial position whereby the drive belt drivingly engages the series of rollers to a second position whereby the drive belt does not drivingly engage the series of rollers.

The invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, a drive apparatus to actuate the rotating pipe element, thereby moving the at least one push-arm assembly to a position in contact with at least one of the objects to move the at least one of the objects along the series of rollers, a framework with a drive belt entrance, a drive belt exit, and at least one slot, the framework being attached to the frame element, a drive belt, which engages the series of rollers and enters the framework through the drive belt entrance and exits the framework through the drive belt exit, at least one roller mounted in the at least one slot, and a drive apparatus with an end attached to the at least one roller to move the at least one roller along the at least one slot within the framework to engage the drive belt from an initial position whereby the drive belt drivingly engages the series of rollers to a second position whereby the drive belt does not drivingly engage the series of rollers, and a brake having a housing attached to the end of the drive apparatus, a ratchet arm with a top, a bottom, and a pivot, rotatably mounted by the pivot within the housing, a toothed rack which lockingly engages the bottom of the ratchet arm and is attached to the generally planar outer framework, and an apparatus attached to the top of the ratchet arm to move the ratchet arm around the pivot of the ratchet arm thereby moving the bottom of the ratchet arm from an initial position whereby the bottom of the ratchet arm lockingly engages the toothed rack to a second position whereby the bottom of the ratchet arm disengages the toothed rack.

The invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, a drive apparatus to actuate the rotating pipe element, thereby moving the at least one push-arm assembly to a position in contact with at least one of the objects to move the at least one of the objects along the series of rollers, and a roller drive, which engages the series of rollers, a driven sprocket, which drives the roller drive, a drive chain, which drives the driven sprocket, a framework, with at least one slot and attached to the frame element, which houses the drive chain and the driven sprocket, a drive sprocket in driving communication with the drive chain, at least one movable sprocket slidably mounted in the at least one slot, and a drive apparatus with an end attached to the at least one movable sprocket to move the at least one movable sprocket along the at least one slot from an initial position whereby the drive chain drivingly engages the driven sprocket and does not engage the at least one movable sprocket to a second position whereby the at least one movable drive sprocket engages the drive chain and moves the drive chain out of contact with the driven sprocket so that the drive chain does not drivingly engage the driven sprocket.

The invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, a drive apparatus to actuate the rotating pipe element, thereby moving the at least one push-arm assembly to a position in contact with at least one of the objects to move the at least one of the objects along the series of rollers, a roller drive, which engages the series of rollers, a driven sprocket, which drives the roller drive, a drive chain, which drives the driven sprocket, a framework, with at least one slot and attached to the frame element, which houses the drive chain and the driven sprocket, a drive sprocket in driving communication with the drive chain, at least one movable sprocket slidably mounted in the at least one slot, and a drive apparatus with an end attached to the at least one movable sprocket to move the at least one movable sprocket along the at least one slot from an initial position whereby the drive chain drivingly engages the driven sprocket and does not engage the at least one movable sprocket to a second position whereby the at least one movable drive sprocket engages the drive chain and moves the drive chain out of contact with the driven sprocket so that the drive chain does not drivingly engage the driven sprocket, and a brake having a housing attached to the end of the drive apparatus, a ratchet arm with a top, a bottom, and a pivot, rotatably mounted by the pivot within the housing, a toothed rack which lockingly engages the bottom of the ratchet arm and is attached to the generally planar outer framework, and an apparatus attached to the top of the ratchet arm to move the ratchet arm around the pivot of the ratchet arm thereby moving the bottom of the ratchet arm from an initial position whereby the bottom of the ratchet arm lockingly engages the toothed rack to a second position whereby the bottom of the ratchet arm disengages the toothed rack.

This invention, in another embodiment, is an apparatus for the movement of a plurality objects on rollers, the apparatus including a frame element, a series of rollers, whereby the series of rollers are mounted in the frame element such that each roller in the series of rollers rotates within the frame element so that the plurality of objects resting on the series of rollers may travel from a first end of the series of rollers to a second terminal end of the series of rollers, a rotating pipe element suspended over the series of rollers, which rotating pipe element pivots along a longitudinal axis and which rotating pipe element is driven at one end, at least one push-arm assembly connected to the rotating pipe element, and a drive apparatus to actuate the rotating pipe element, thereby moving the at least one push-arm assembly to a position in contact with the plurality objects to move the plurality of the objects along the series of rollers.

This invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element with an end suspended over the series of rollers, which rotating pipe element pivots along a longitudinal axis and which rotating pipe element is driven at the end, a pivot yoke attached to the end of the rotating pipe element, a pivot cylinder integrated in a driving relationship with the pivot yoke, a box-pulling shaft, with an end, contained within and attached to the rotating pipe element, the box pulling shaft having a longitudinal axis collinear with the longitudinal axis of the rotating pipe element, and the box pulling shaft also having a steel collar attached to the end of the box-pulling shaft the steel collar attachable to additional box-pulling shafts and the box-pulling shaft having at least one r-shaped joint element, attached to the box-pulling shaft, the at least one r-shaped joint element having a protruding end and two collinear ends, whereby the two collinear ends of the r-shaped joint element surround the box-pulling shaft, and one or more position-securing elements integrated into the protruding end of the r-shaped joint, at least one push-arm assembly, connected to the protruding end of the r-shaped joint, having a collapsible arm with an end, a spring-load element with a first end and a second end, the first end of the spring-loaded element attached to the end of the collapsible arm and the second end of the spring-loaded element attached to the protruding end of the r-shaped joint by the one or more position-securing elements integrated into the protruding end of the r-shaped joint, and a drive apparatus attached to the pivot cylinder for driving the pivot yoke, which actuates the rotating pipe element and thereby moving the at least one push-arm assembly to a position in contact with the at least one of the objects to move the at least one of the objects along the series of rollers wherein the drive apparatus includes a control apparatus, for regulating a flow of objects along the series of rollers, and a ram cylinder which is attached to a union element attached to the box-pulling shaft.

The invention, in another embodiment, is an apparatus for the movement of objects on rollers, the apparatus including a frame element, a series of rollers, whereby the series of rollers are mounted in the frame element such that each roller in the series of rollers rotates within the frame element so that the objects resting on the series of rollers may travel from a first end of the series of rollers to a second terminal end of the series of rollers, a rotating pipe element with an end suspended over the series of rollers, which rotating pipe element pivots along a longitudinal axis and which rotating pipe element is driven at the end, a pivot yoke attached to the end of the rotating pipe element, a pivot cylinder integrated in a driving relationship with the pivot yoke, a box-pulling shaft, with an end, contained within and attached to the rotating pipe element, the box pulling shaft having a longitudinal axis collinear with the longitudinal axis of the rotating pipe element, and the box pulling shaft further having a steel collar attached to the end of the box-pulling shaft the steel collar attachable to additional box-pulling shafts, at least one r-shaped joint element, attached to the box-pulling shaft, having a protruding end and two collinear ends, whereby the two collinear ends of the r-shaped joint element surround the box-pulling shaft, and one or more position-securing elements integrated into the protruding end of the r-shaped joint, at least one push-arm assembly, connected to the protruding end of the r-shaped joint, having a collapsible arm with an end, a spring-load element with a first end and a second end, the first end of the spring-loaded element attached to the end of the collapsible arm and the second end of the spring-loaded element attached to the protruding end of the r-shaped joint by the one or more position-securing elements integrated into the protruding end of the r-shaped joint, a drive apparatus attached to the pivot cylinder for driving the pivot yoke, which actuates the rotating pipe element and thereby moving the at least one push-arm assembly to a position in contact with the at least one of the objects to move the at least one of the objects along the series of rollers wherein the drive apparatus includes a control apparatus, for regulating a flow of objects along the series of rollers, and a ram cylinder which is attached to a union element attached to the box-pulling shaft, a lift roller mechanism having a generally planar outer framework attached to the frame element, an inner framework located inside the generally planar outer framework, at least one lift roller having an arm with at least one side, a top and a bottom, wherein the bottom of the arm is attached to the inner framework, and at least one wheel is attached to the top of the arm, at least one wedge-shaped roller lift cam, with a side and a base, the base of at least one wedge-shaped roller lift cam attached to the generally planar outer framework, wherein the at least one side of the at least one lift roller slides along the side of the at least one wedge-shaped roller lift cam, a drive apparatus to move the inner framework, thereby moving the at least one side of the at least one lift roller along the side of the at least one wedge-shaped roller lift cam so that the wheel located at the top of the at least one lift roller protrudes through the series of rollers to a position in contact with the at least one of the objects, and a brake having a housing attached to the inner framework, a ratchet arm with a top, a bottom, and a pivot, rotatably mounted by the pivot within the housing, a toothed rack which lockingly engages the bottom of the ratchet arm and is attached to the generally planar outer framework, and an apparatus attached to the top of the ratchet arm to move the ratchet arm around the pivot of the ratchet arm and move the bottom of the ratchet arm from an initial position whereby the bottom of the ratchet arm lockingly engages the toothed rack to a second position whereby the bottom of the ratchet arm disengages the toothed rack, a belt-slip mechanism having a framework with a drive belt entrance, a drive belt exit, and at least one slot, the framework being attached to the frame element, a drive belt, which engages the series of rollers and enters the framework through the drive belt entrance and exits the framework through the drive belt exit, at least one roller mounted in the at least one slot, a drive apparatus with an end attached to the at least one roller to move the at least one roller along the at least one slot within the framework to engage the drive belt from an initial position whereby the drive belt drivingly engages the series of rollers to a second position whereby the drive belt does not drivingly engage the series of rollers, and a brake having a housing attached to the end of the drive apparatus, a ratchet arm with a top, a bottom, and a pivot, rotatably mounted by the pivot within the housing, a toothed rack which lockingly engages the bottom of the ratchet arm and is attached to the generally planar outer framework, and an apparatus attached to the top of the ratchet arm to move the ratchet arm around the pivot of the ratchet arm and move the bottom of the ratchet arm from an initial position whereby the bottom of the ratchet arm lockingly engages the toothed rack to a second position whereby the bottom of the ratchet arm disengages the toothed rack, and a chain-slip mechanism having a roller drive, which engages the series of rollers, a driven sprocket, which drives the roller drive, a drive chain, which drives the driven sprocket, a framework, with at least one slot and attached to the frame element, which houses the drive chain and the driven sprocket, a drive sprocket in driving communication with the drive chain, at least one movable sprocket slidably mounted in the at least one slot, a drive apparatus with an end attached to the at least one movable sprocket to move the at least one movable sprocket along the at least one slot from an initial position whereby the drive chain drivingly engages the driven sprocket and does not engage the at least one movable sprocket to a second position whereby the at least one movable drive sprocket engages the drive chain and moves the drive chain out of contact with the driven sprocket so that the drive chain does not drivingly engage the driven sprocket, and a brake having a housing attached to the end of the drive apparatus, a ratchet arm with a top, a bottom, and a pivot, rotatably mounted by the pivot within the housing, a toothed rack which lockingly engages the bottom of the ratchet arm and is attached to the generally planar outer framework, and an apparatus attached to the top of the ratchet arm to move the ratchet arm around the pivot of the ratchet arm and move the bottom of the ratchet arm from an initial position whereby the bottom of the ratchet arm lockingly engages the toothed rack to a second position whereby the bottom of the ratchet arm disengages the toothed rack.

In one aspect, the present invention discloses a method for using a system as described above.

4. BRIEF DESCRIPTION OF THE DRAWINGS

FIG. 1A is a schematic diagram of a system according to the present invention. FIG. 1B is a side view of the system of FIG. 1A.

FIG. 2A is a front view of a rotating pipe of the system of FIGS. 1A and 1B in a fully retracted position. FIG. 2B is a front view of a rotating pipe of the system of FIGS. 1A and 1B in a fully extended position.

FIG. 3 is a front view of a push arm shaft assembly of the system of FIGS. 1A and 1B.

Figures 4A, 4B, 4C:
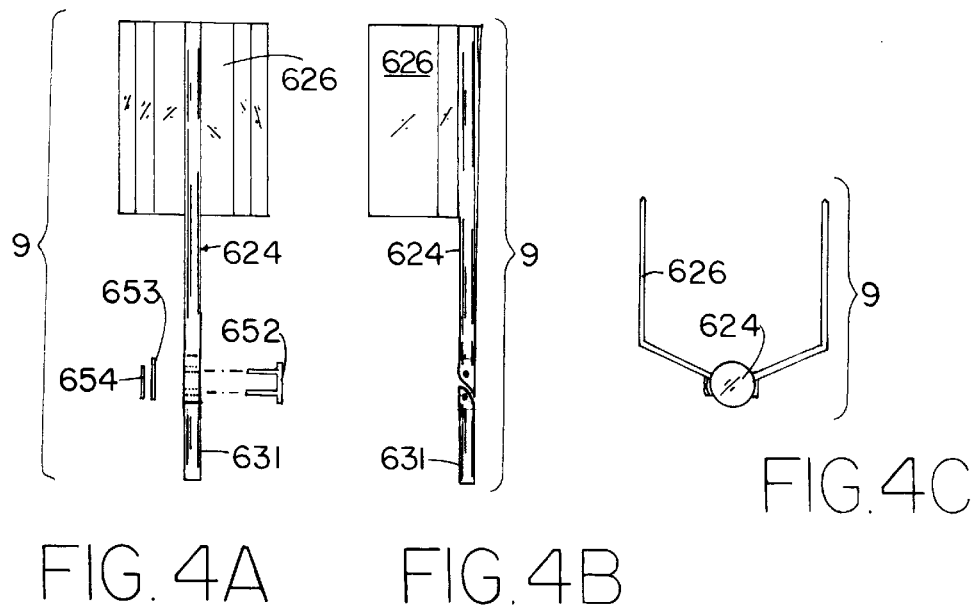

FIG. 4A is a top view of a collapsible arm element of the system of FIGS. 1A and 1B. FIG. 4B is a side view of the element of FIG. 4A. FIG. 4C is an end view of the element of FIG. 4A.

Figure 4D:
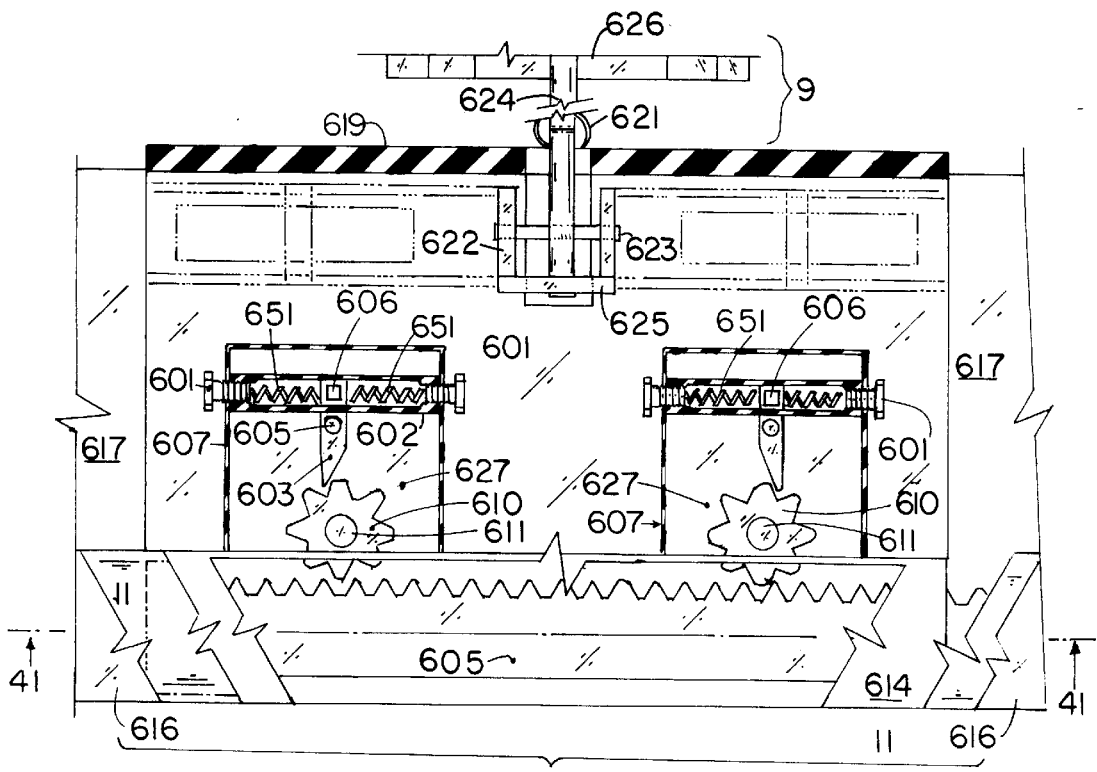
Figure 4E:
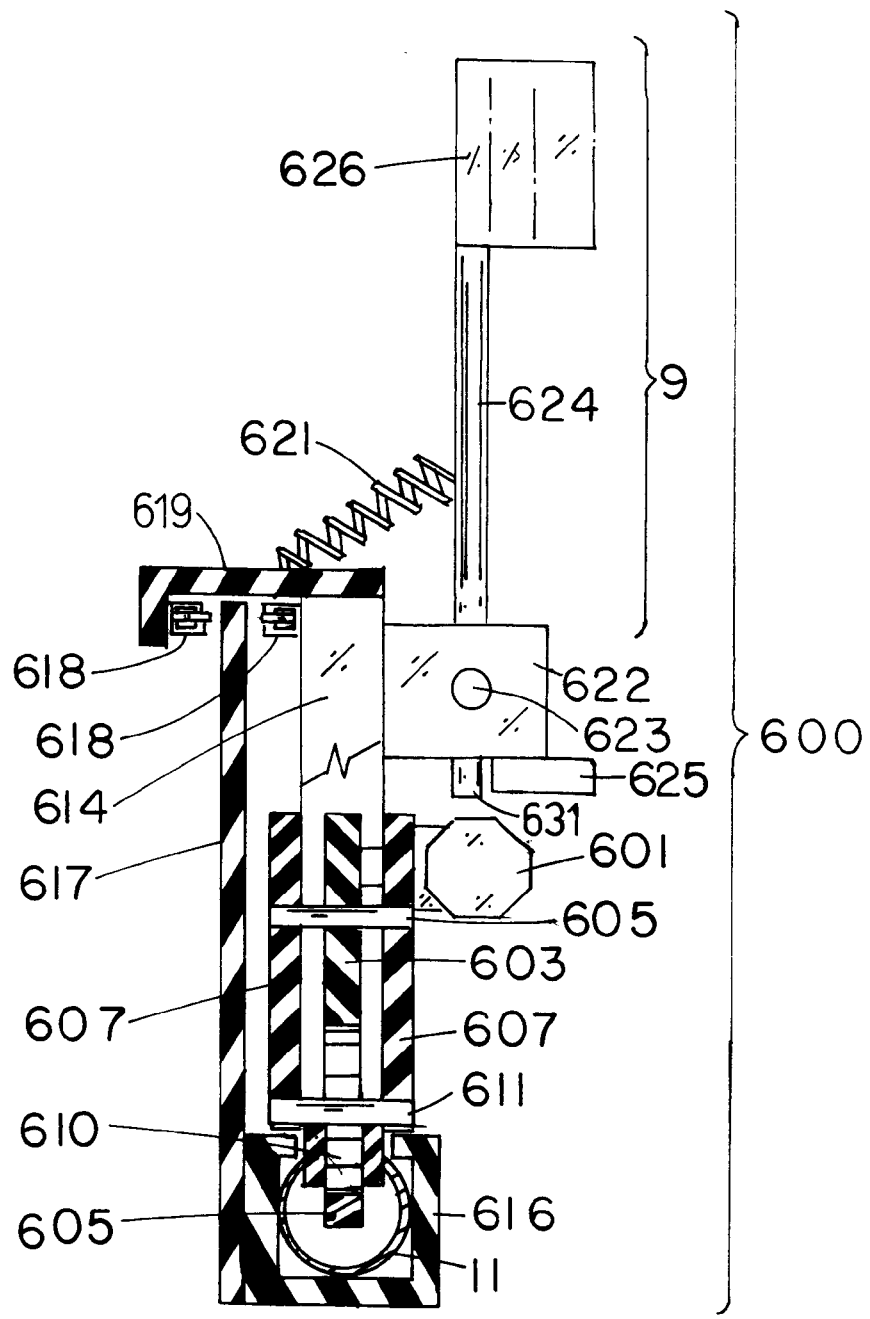

FIG. 4D is a front view of an alternative push arm assembly of the system of FIGS. 1A and 1B. FIG. 4E is a side view of alternative push arm assembly of FIG. 4D.

Figure 5A:
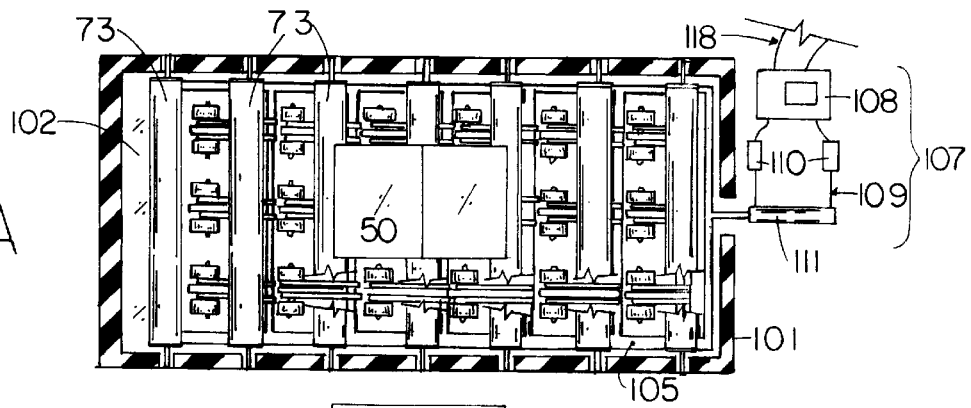
Figure 5B:
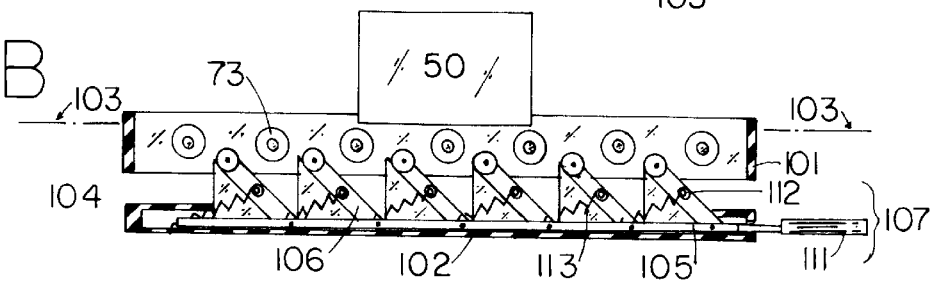

FIG. 5A is a top view of a lift roller mechanism of the system of FIG. 1, deactivated. FIG. 5B is a side view of the mechanism of FIG. 5A.

Figure 6A:
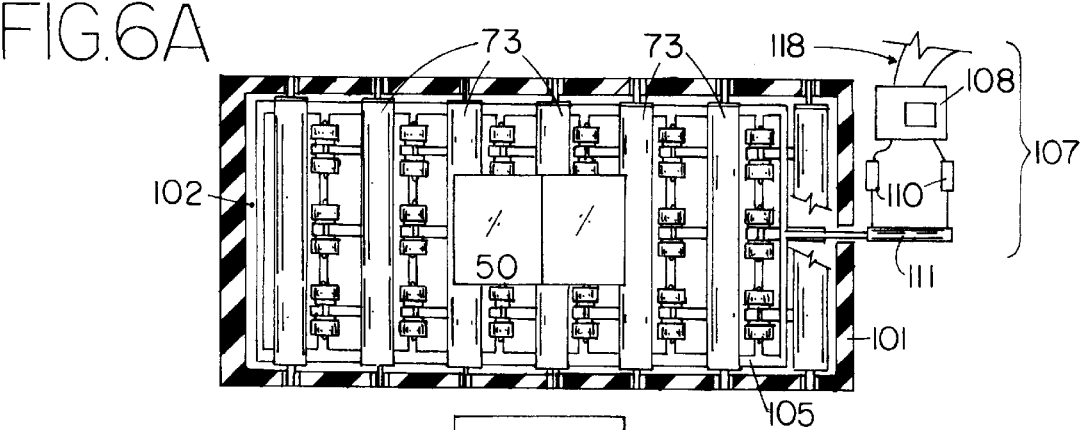
Figure 6B:
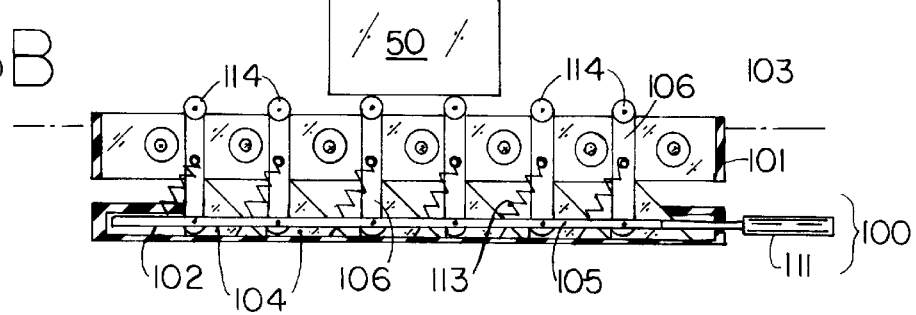

FIG. 6A is a top view of the mechanism of FIG. 5A in an activated mode. FIG. 6B is a side view of the mechanism of FIG. 6A.

Figure 7A:
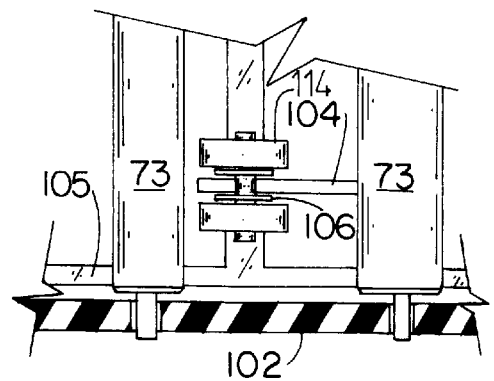
Figure 7B:
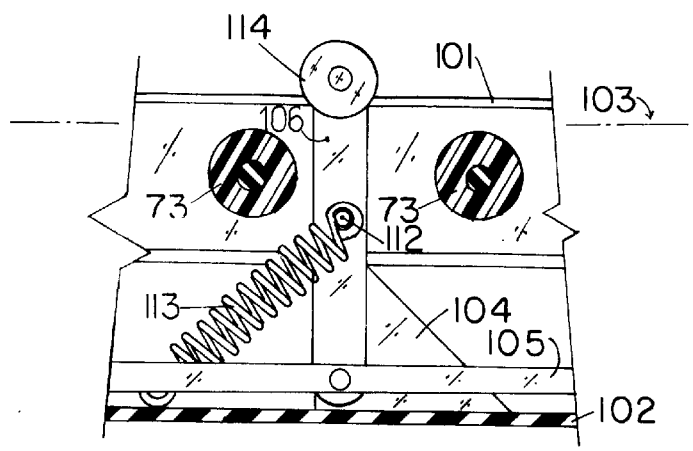
Figure 7C:
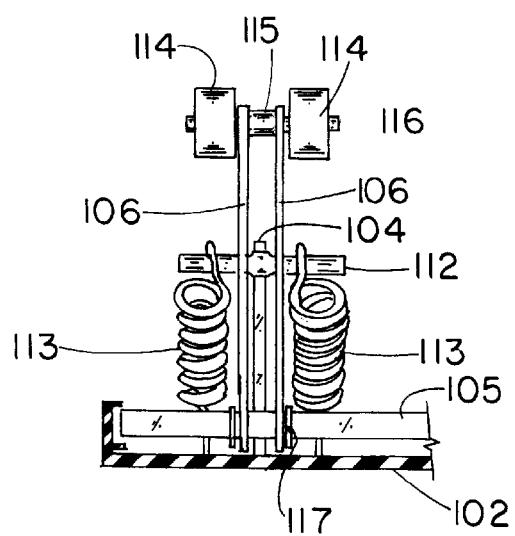

FIG. 7A is a top view of a roller wheel cam lift mechanism of the system of FIG. 1, deactivated. FIG. 7B is a side view of the mechanism of FIG. 7A. FIG. 7C is an end view of the mechanism of FIG. 7A.

Figure 8A:
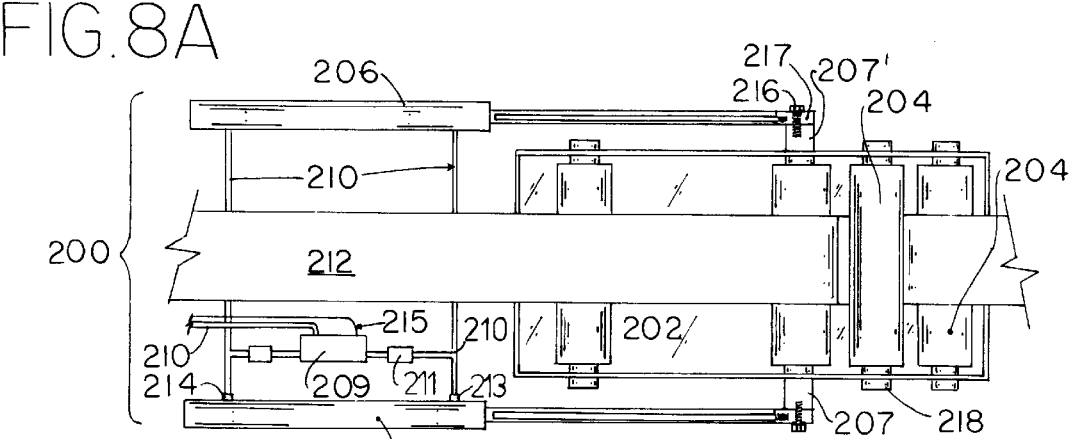
Figure 8B:
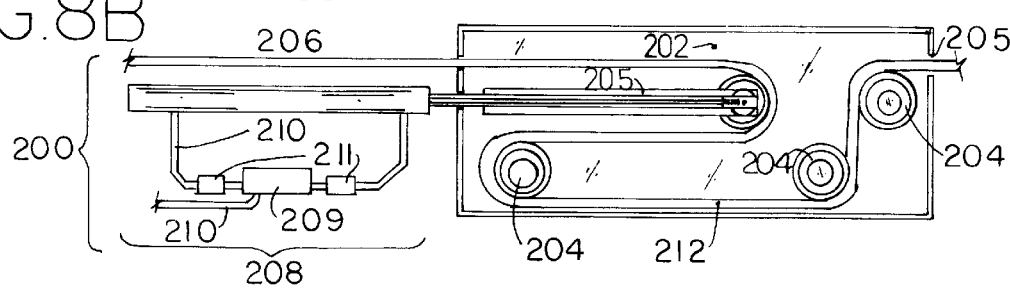

FIG. 8A is a top view of a belt slip mechanism of the system of FIG. 1, deactivated. FIG. 8B is a side view of the mechanism of FIG. 5A.

Figure 9A:
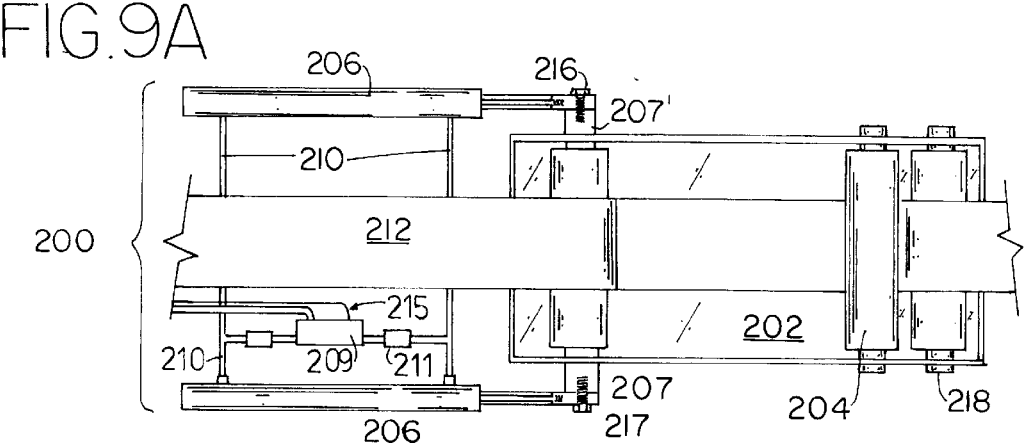
Figure 9B:
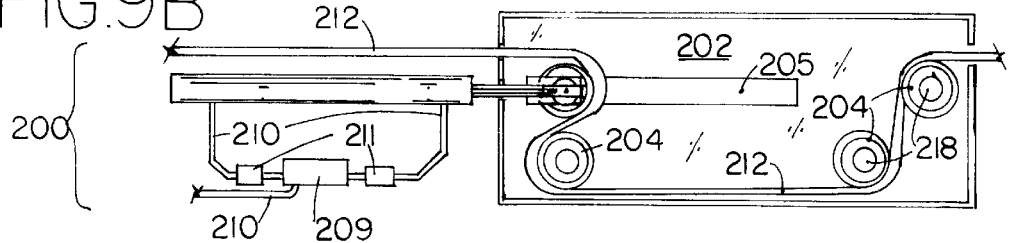

FIG. 9A is a top view of the mechanism of FIG. 8A in an activated mode. FIG. 9B is a side view of the mechanism of FIG. 9A.

Figure 10:
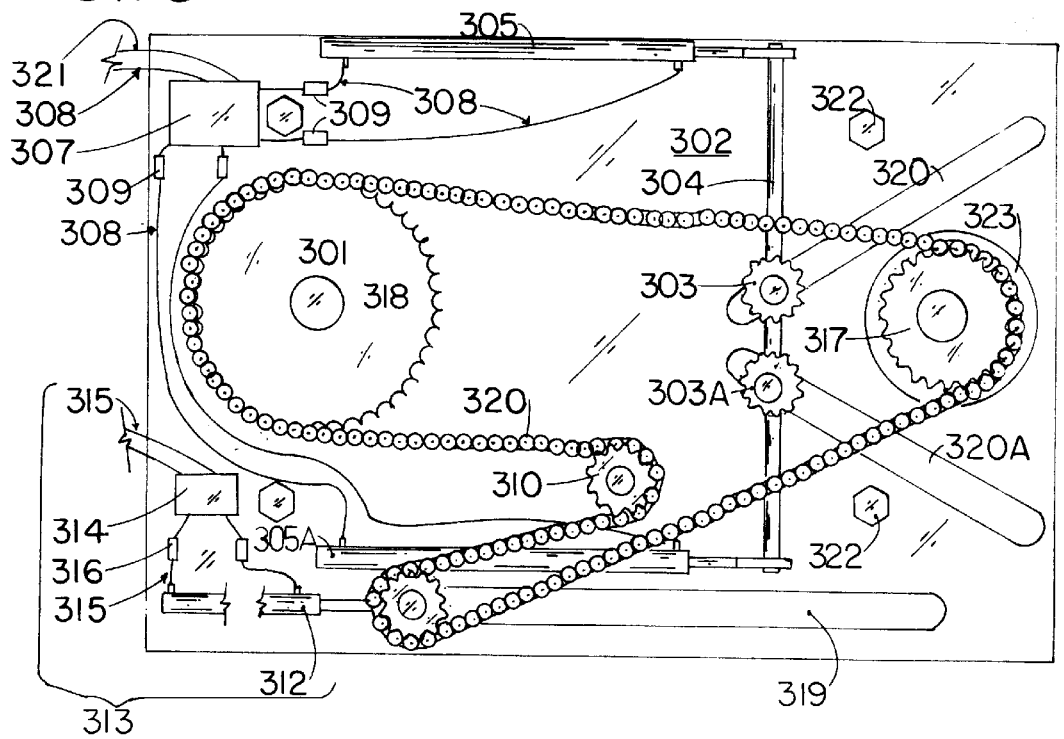

FIG. 10 is a side view of a deactivated drive chain slip mechanism of the system of FIG. 1.

Figure 11:
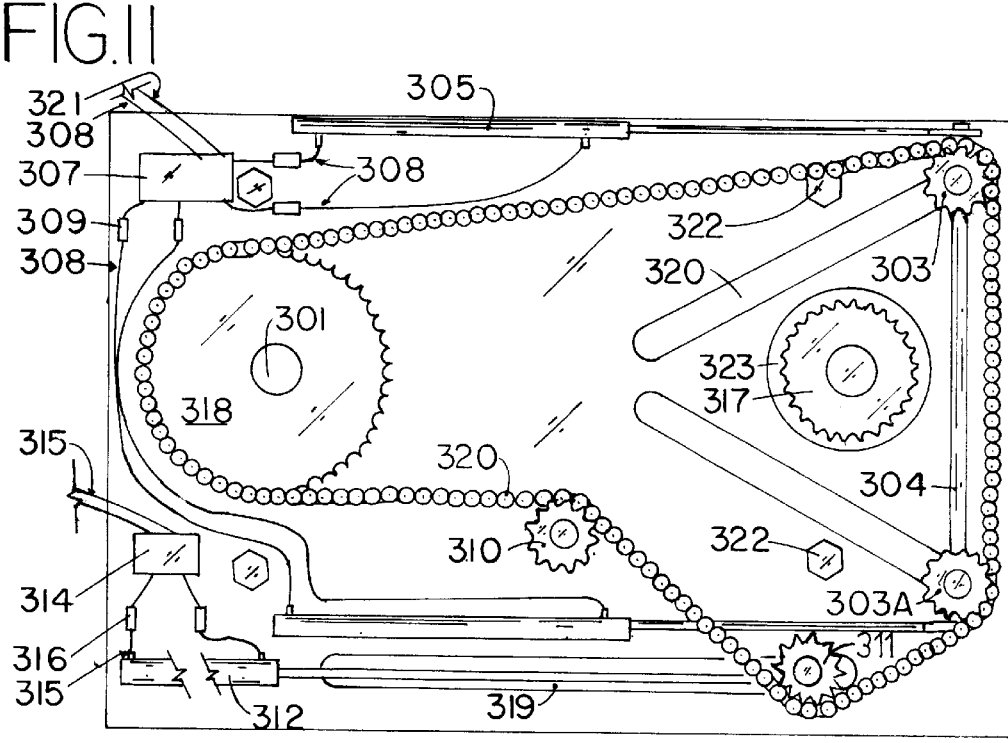

FIG. 11 shows the mechanism of FIG. 10 in an activated mode.

FIG. 12 is a side view of the brake mechanism engaging the notched rack.

FIG. 13 is a side view of the brake mechanism disengaged from the notched rack.

5. DESCRIPTION OF EMBODIMENTS AT THE TIME OF FILING FOR THIS PATENT

This invention, in certain embodiments, is an improved conveyor system for moving objects, namely boxes with a box line, along a series of conveyor-rollers, the system including a rotating pipe element, a series of push-arm assemblies, a drive apparatus for actuating the rotating pipe and push arm mechanism shaft assemblies, a sensing apparatus, a series of lift rollers, a belt-slip mechanism, a drive chain-slip mechanism, and a brake mechanism.

Such a system has many advantages over prior art systems. The first advantage is that when jams occur on a conveyor system, this invention stops the conveyor from piling more boxes or objects to the jam area, thus less damage is occasioned the boxes or objects on the conveyor and conveyor operators are less subject to injury from either the boxes or the objects on the conveyor, or the drive mechanisms of the conveyor. Another advantage of the various embodiments of this invention is that the push-arm assemblies of this apparatus, when activated, move to engage and push boxes or other objects on a conveyor. Another advantage entails safety: upon a series of jams on the conveyor, which are detected by various sensing apparatuses, the drive belt or the drive chain, or both, disengage to prevent the conveyor from moving even more objects or boxes on the conveyor to the area of the jam. Additionally, this invention employs a series of wheeled lift-cam apparatuses, which when activated, protrude through the rollers of the conveyor to lift, enhance, and resume movement of the boxes or other objects on the conveyor.

The first element of one system according to the present invention is a rotating pipe with a first end and a second end. The rotating pipe pivots along a longitudinal axis and is driven by a pivot yoke attached to the first end. The pivot yoke is driven by a pivot cylinder. The rotating pipe has on the second end a steel collar to which another rotating pipe, or in a series, a plurality of rotating pipes may be attached.

The second element of one system according to the present invention is a series of push-arm assemblies connected to the rotating pipe element. Each push-arm assembly comprises at least one collapsible arm with an end, an reshaped joint, and a box-pulling shaft with a first end and a second end. The at least one collapsible arm is attached at one end to an end to the r-shaped joint. The end of the each r-shaped joint surrounds a portion of the box-pulling shaft, which shaft contains a spring to allow the r-shaped joint to maintain its position relative to the push arm mechanism shaft. The box-pulling shaft has a longitudinal axis which is collinear with the longitudinal axis of the rotating pipe. Attached to the first end and the second end of the box-pulling shaft is a steel collar or a steel collar adaptor to attach the box-pulling shaft either with one or more box-pulling shafts. The box-pulling shaft has a longitudinal axis which is collinear with the common longitudinal axis of both the rotating pipe and the box-pulling shaft.

Another version of the second element of one system according to the present invention uses an alternative series of push-arm assemblies connected to the rotating pipe element. Each alternative push-arm assembly includes a collapsible arm with an end, an arm mount plate, at least one gear with teeth, and a notched track. The collapsible arm is attached at its end to a mounting element, in which mounting element is a pivot by which the collapsible arm rotates. The collapsible arm is held in a position relative to the mount plate by a spring element. The mounting element is attached to the upper end of the mount plate. The base of the mount plate extends into and slides along a path parallel to the longitudinal axis of the rotating pipe element and within the rotating pipe element. Near the lower end of the mount plate is an axle which supports at least one gear, the teeth of which gear extend below the base of the mount plate. The teeth of the at least one gear engage the notched track, which is attached to the rotating pipe element; when the rotating pipe element rotates, the notched track, mount plate, and collapsible arm also rotate to engage the object or box on the conveyor.

The third element of one system according to the present invention is a drive apparatus connected to a pivot cylinder and a pivot yoke for simultaneously actuating the rotating pipe and push arm mechanism shaft assemblies. The pivot yoke is attached to the end of the rotating pipe. The pivot cylinder drives the pivot yoke, and therefore, the rotating pipe, which moves the push arm mechanisms, which move the boxes or other objects along the series of conveyor-rollers. The drive apparatus has a control means, for regulating the flow of boxes along the series of rollers, and a ram cylinder, for engaging the box-pulling shaft.

The fourth element of one system according to the present invention is a sensing apparatus to detect the absence of an object from a location at the starting position of the box-pulling cycle. The sensing device may be one or more electronic photo cell sensors. In the normally-open electrical state, the sensing device permits the box-pulling operation to continue. The sensing devices are located in numerous places along the frame which holds the roller and are underneath the rotating pipe, and are to the side of the boxes or objects moving down the series of rollers. The sensing devices are connected to central control apparatus, which central control apparatus activates the rotating pipe, push arm mechanisms, box pulling shaft or shafts; the chain slip mechanism, the belt slip mechanism and the lift rollers, when activated, also activate the rotating pipe, push arm mechanisms, box pulling shaft or shafts.

The fifth element of one system according to the present invention is a series of lift rollers. The series of lift rollers is located within the frame element, beneath the series of conveyor rollers. Each lift rollers in the series of lift rollers is connected to a wedge-shaped roller cam within the frame. In the deactivated position, the lift rollers rest below the box line. The series of lift rollers is activated in unison by a drive cylinder and controlled by a drive apparatus. When activated, each lift roller in the series of lift rollers rises along the incline of the wedge-shaped roller cam to a position above the box line to lift the base of a the object so that the object rolls down the lift rollers to resume travel along the rollers.

The sixth element of one system according to the present invention is a belt-slip mechanism with a frame, three directional rollers, a movable tension belt roller, a drive belt and a belt-slip-mechanism drive apparatus. The belt-slip mechanism is attached to the frame of the conveyor in line with the belt which drives the series of rollers. The three directional rollers are mounted in a fixed position within the frame and parallel to one another with the tension belt roller mounted within a pair of grooves in the same frame so the tension belt roller moves a path parallel to each of the three directional rollers. A pair of cylinders are connected, one at each end of the tension belt roller, and the second end of each cylinder is attached to the frame. The path of the belt proceeds through the frame and around each of the three directional rollers and the tension belt roller. In normal operation of the conveyor, each cylinder is extended thus pushing the tension belt roller to a relative distal position near the ends of each of the pair of grooves thus maintaining tension on the belt. Maintaining tension on the belt permits the transfer of energy along the belt to the series of rollers on the conveyor. When the belt for the conveyor fails to function properly, or when the belt is disengaged either automatically or by other switching means, the cylinders retract, thus moving the tension belt roller along a path parallel to the directional rollers in the frame and within the grooves to a second position such that tension on the belt is relaxed and the drive function of the belt is disabled to prevent the transfer of energy to the series of rollers on the conveyor.

The seventh element of one system according to the present invention is a drive chain-slip mechanism with a frame with a path, a drive chain, a drive sprocket, two movable drive-chain sprockets, a shaft with two ends, two drive chain-slip cylinders, and a drive chain-slip control means. The chain-slip mechanism is attached to the frame of the conveyor. The drive sprocket is located in the frame and mounted to an axle which protrudes through and rotates within the frame and which is driven by a drive mechanism. The drive sprocket drives the drive chain; the drive chain assumes a circuitous path within the frame. In normal operation, the drive chain, driven by the drive sprocket, engages a driven sprocket, and the driven sprocket is attached to an axle which ultimately drives the conveyor belt. In the normal operation, a cylinder is retracted, the end of the lone cylinder is attached to a movable chain tension sprocket to maintain tautness of the chain during normal operation. During normal operation, the two movable chain sprockets, each of which are mounted within each of two grooves in the frame and are attached to a shaft with two ends, do not engage the drive chain; during this time, two additional cylinders, attached at one end to each end of the shaft and at the other ends to the frame, are in a retracted position. When the conveyor fails to function properly, or when the conveyor is disengaged either automatically or by other switching means, the cylinders within the frame extend simultaneously. When the two cylinders attached to the shaft extend, the shaft moves the two movable sprockets within their respective grooves to distal positions relative to the end of the grooves; in the process of moving to the distal positions relative to the end of the grooves, the movable sprockets engage the drive chain and disengage the drive chain from the drive sprocket, thus disabling the transfer of kinetic energy from the drive sprocket to the drive chain. Simultaneously, the lone cylinder extends from an initial position to an extended position while maintaining the tautness of the chain.

The eighth element of one system according to the present invention is a brake mechanism attached to the belt-slip mechanism, the chain slip mechanism and the series of lift rollers. The housing of the brake mechanism is mounted on a moving component. A toothed rack is mounted on a stationary element to effect the locking into a toothed notch of the toothed rack. A ratchet arm holds the position of the elements to be secured; disengaging the ratchet arm from the toothed rack permits the relative position of mechanism members to change. The ratchet arm pivots by an electric solenoid attached to the housing of the brake mechanism.

This invention, in one aspect, is an improved conveyor system (10) for moving objects along a series of rollers. As shown in FIG. 1A, the conveyor system (10) has a rotating pipe element (11) with a first end (71) and a second end (72). The rotating pipe element (11) pivots along a longitudinal axis (31). Rotating pipe element (11) is also driven at the first end (32) by a pivot yoke (17), which is, in turn, driven by a pivot cylinder (15). As shown in FIGS. 1A, 2A and 2B, attached to the second end (72) of rotating pipe element (11) is a steel collar (33) for attaching one or more other rotating pipe elements (11') in a series. The first end (71) and the second end (72) of rotating pipe element (11) rotate within pipe-support bearings (19).

The apparatus (10) has at least one push-arm assembly (22) as shown in FIGS. 1A and 3 with a collapsible arm (9), an r-shaped joint (27), a box-pulling shaft (23) and tension-adjustable springs (30). Referring to FIGS. 4A, 4B and 4C, the collapsible arm (9) consists of a rod (624) with an upper end and a lower end, a box separator plate (626) attached to the upper end of the rod (624), connecting link elements (652 & 653) attached to the lower end of the rod (624), and a lower rod element (631) attached at one end to the lower end of rod (624) by the connecting link elements (652 & 653). The lower rod element (631) of collapsible arm (9) is attached to the protruding end (29) of the r-shaped joint (27). The collinear ends of (28 & 28') of the r-shaped joint (27) surround an intermediate portion of the box-pulling shaft (23). The box-pulling shaft (23) shares its longitudinal axis with at least one tension adjustable spring (30). Adjustable springs (30) coil around the box pulling shaft (23). Springs (30) are to each side of the box-pulling shaft (23) from the r-shaped joint (27) to permit the return of the r-shaped joint (27) to an initial rest position relative to the box-pulling shaft (23). The tension and position of adjustable spring (30) is adjusted by jam nuts (25).

The collapsible arm (9) of push arm assembly (22) protrudes through at least one longitudinal slot (43) on rotating pipe (11). During operation of the rotating pipe element (11), the push arm assembly (22) experiences rotary motion from an initial rest position, as shown in FIG. 2A where the slot (43) and, though not shown, collapsible arm (9) are generally vertical, to a second position, as shown in FIG. 2B where the slot (43), and though not shown, collapsible arm (9) assume a generally horizontal position.

In operation, the push arm assembly (22) is rotated from an initial, generally vertical position to a second, generally horizontal position so that the arm (9) is largely parallel to a plane defined by the series of rollers (73) on the conveyor (101). The arm (9) engages the object (50) on the conveyor (101). In engaging the object (50) on the conveyor (101), the arm (9) slightly nudges the object (50) thus correcting the direction and intended movement of the object (50) on the conveyor (101). In the process of engaging the object (50) on the conveyor (101), the arm (9) may move the r-shaped joint (27) in either direction along the box-pulling shaft (23). The springs (30) on the box-pulling shaft (23) to either side of the r-shaped joint (27) return the r-shaped joint (27) to its original rest position on the box-pulling shaft (23). The springs (30), providing resistance against the movement of the r-shaped joint (27) along the box-pulling shaft (23), thus regulates the motion and position of the collapsible arm (9).

Furthermore, the box-pulling shaft (23) as well as each shaft (18 and 18') in the series, share a common longitudinal axis (41) which is collinear with the longitudinal axis (31) of the rotating pipe element (11). Attached to the ends of the push-arm assembly (22) are adapters (35 & 35') and a steel collar (26 & 26') for attaching one or more push-arm assemblies (22').

In another embodiment of the invention employs an alternative push-arm assembly, shown in FIGS. 4C and 4D. Each alternative push-arm assembly (600) includes the collapsible arm (9) with an end (601), an arm mount plate (614), and at least one gear (610) with teeth (627) which moves along a notched track (605). The collapsible arm (9) is attached at its end (601) to a mounting element (622), in which mounting element (622) is a pivot (623) by which the collapsible arm (9) rotates. The collapsible arm (9) is held in a position relative to the mount plate (614) by a spring element (621). The mounting element (622) is attached to the upper end of the mount plate (614). The base of the mount plate (614) extends into and slides along a path parallel to the longitudinal axis (41) of the rotating pipe element (11) and within the rotating pipe element (11). Near the lower end of the mount plate (614) is an axle (611) which supports at least one gear (610), the teeth (627) of which gear (610) extend below the base of the mount plate (614). The teeth (627) of the at least one gear (610) engage the notched track (605), which is attached to the rotating pipe element (11). When the rotating pipe element (11) rotates, the notched track (605), mount plate (614) and collapsible arm (9) rotate together to enable the box separator plate (626) of collapsible arm (9) to engage the object or box (50) on the conveyor (101). As shown n FIGS. 4D and 4E, attached to the top end of mount plate (614) is a stabilizer end plate (619) with bearings (618). Bearings (618) engage the top end of stabilizer plate (617). Stabilizer plate (617) is attached at its bottom end to a housing (616) which surrounds and is attached to rotating pipe element (11) so that the rotating function of rotating pipe element (11) is not impeded. In operation, the alternate push arm assembly (600) moves along the notched track (605), rotates with the rotating pipe element (11), and is stabilized in its rotational motion by stabilizer end plate (619) and bearings (618) working in conjunction with stabilizer plate (617) and housing (616).

Additionally, as shown in FIG. 4D, gear (610) is secured by a gear ratchet mechanism (607). Gear ratchet mechanism (607) includes a ratchet arm (603), a ratchet arm shaft (605) and tension adjusting mechanisms (602). Ratchet arm (603) engages teeth (627) of gear (610) and impedes rotary motion the gear (610) along the notched track (605). Ratchet arm (603) pivots around a ratchet arm shaft (605). Rotary motion of the ratchet arm (603) is limited by the tension adjusting mechanisms (602) located at the distal end of ratchet arm (603) opposite the end which engages the gear teeth (627). Tension adjusting mechanisms (602), in one embodiment of this invention, include tension adjusting bolts (601) and tension springs (651). The setting of the tension bolt (601) determines the ease with which gear (610) and therefore the alternate push-arm assembly (600) moves along the notched rack (605). Notched rack (605) replaces the function of box-pulling shaft (23) in the previous embodiment.

As shown in FIGS. 1A and 1B, system (10) also includes a drive apparatus (40) located external to the frame (101) and connected by appropriate lines and electrical connections to, ultimately, the pivot cylinder (15), which pivot cylinder (15) actuates the pivot yoke (17), which pivot yoke (17) actuates the rotating pipe (11) and push-arm assembly (22).

The control elements of the drive apparatus (40) in FIG. 1A include a double-solenoid ram cylinder valve (12), ram cylinder limit switch (13), a pivot cylinder yoke (17), a pivot cylinder limit switch (14), flow lines (52) and flow control valves (12A and 16A). Double solenoid ram cylinder valve (12), in conjunction with flow control valves (12A), selectively actuates ram cylinder (51) pneumatically or hydraulically. Pivot cylinder limit switch (13) controls the ram cylinder (51), which ram cylinder (51) engages shaft (18). Double-solenoid pivot cylinder valve (16), in conjunction with flow control valves (16A), activates pivot cylinder (15), which is either pneumatically or hydraulically operated. Motion of pivot cylinder (15) is controlled by cylinder limit switch (14).

Lift roller devices (100) in FIGS. 1B, 5A, 5B, 6A, 6B, 7A, 7B & 7C move an object (50) or a series of objects above the series of rollers (73). The lift roller device (100) comprises a generally planar outer framework (102) which is generally parallel to conveyor box line (103). Conveyor box line (103) is identified by the bottom portion of the box or object (50) resting on series of rollers (73) on the conveyor (101). The lift roller devices (100) include a plurality of wedge-shaped roller lift cams (104) which are spaced equidistantly from each other. Within outer framework (102) is an inner framework (105) with a plurality of wheeled arms (106). At the upper end of each wheeled arm (106) is at least one freely-rolling wheel (114) with an axis of rotation transverse to path of travel of the wheeled arm (106) along the wedge-shaped roller cam (104). During normal functioning of the conveyor (101), the lift roller devices (100) are in the deactivated position as shown in FIG. 5B. In the deactivated position, the lift rollers (100) rest below the box line (103). The series of lift rollers (100) is activated in unison by a drive cylinder (111) and controlled by a drive apparatus (107). When activated, each free-rolling wheel (114) in each wheeled arm (106) in the series of lift rollers (100) rises along the incline of each wedge-shaped roller cam (104) to a position whereby the free-rolling wheel (114) protrudes above the box line (103) to lift the object (50). The object (50) can roll along the rolls down the lift rollers (100) to disengage the object (50) from the series of rollers (73) and to resume travel. Before or during engagement of the lift cam rollers (100) with the object (50), the box separator plate (626) of the push arm assembly (9) engages the object (50) to facilitate the correction of the position of the object (50) on the conveyor (101) prior to the retraction of the lift cam roller device (100). This elevation of the object (50) is desirable to free the object (50) from the snags and vibrations the object (50) experiences while traversing the series of rollers (73); being free from snags and vibrations, the box separator plate (626) the box or object (50) and repositions the object (50) on the conveyor (101) to amend the course of the travel of the object (50) along the conveyor (101).

As shown in FIG. 5A and FIG. 5B, the motion of the inner framework (105) is controlled by a lift roller drive apparatus (107). The control elements for the lift roller drive apparatus (107) includes a cylinder valve (108), flow lines (109), flow control valves (110) and a pivot cylinder (111). When actuated, the cylinder valve (108) directs flow to the pivot cylinder (111) resulting in movement of the inner framework (105) from an initial rest position (FIG. 5A) to a second position, as shown in FIG. 5B. As shown in FIG. 5B, when activated, the plurality of wheeled arms (106) move generally in the spaces between the roller (73). Transverse to path of travel of the wheeled arm (106) along the wedge-shaped roller cam (104) and laterally extending through the center of each wheeled arm (106) is a cam riding shaft (112).

As shown in FIG. 7B and FIG. 7C, when activated, cam riding shaft (112) guides the wheeled arm (106) to an elevated position. Each spring (113) is attached at one end to the outer framework (102) and at the other end to the cam riding shaft (112). Springs (113) hold the wheeled arm (106) to the wedge-shaped roller cam (104). The object (50) is therefore elevated above the box line (103) to a position above the series of rollers (73) to remove the object (50) from the vibration, snagging, or other impediment to motion on the conveyor (101) to permit the push arm assembly (9) to rectify the motion of the object (50) along the conveyor (101), or more specifically, the series of rollers (73). When deactivated, the cylinder valve (108) redirects flow to the pivot cylinder (111), retracting both the inner framework (105) and the wheeled arms (106) from the extended position, as shown in FIG. 6B and FIG. 7B, to a rest position, as shown in FIG. 5B, where the wheeled arms (106) are at rest below the conveyor box line (103). The object (50) having been moved generally upward by the wheeled arms (106) is replaced on the series of rollers (73) to resume travel along the conveyor (101).

A belt-slip mechanism (200) shown in FIGS. 8A through 9B permits control of the velocity of the belt-driven conveyors. The belt-slip mechanism has a framework (202) with two slots (205), at least three directional rollers (204), a movable roller (203), and at least one ram cylinder (206). The at least three directional rollers (204) guide the drive belt (212) along its intended path. The movable roller (203) is mounted in the framework (202) between the two slots (205). Ram cylinder (206 and 206') are attached to each of end (207 and 207') of movable roller (203). The ram cylinders (206 and 206') are controlled by a belt-slip mechanism drive apparatus (208) with a cylinder valve (209), flow lines (210), and, flow control valves (211). In normal operations, the drive belt (212)engages the rollers (73) to drive the rollers (73), as shown in FIG. 1B. In the normal operating position for the belt-slip mechanism, shown in FIGS. 8A & 8B, the ram cylinders (206 and 208') are at a first position with the movable roller (203) maintaining sufficient tension on the drive belt (212) for the drive belt (212) to engage the rollers (73), as shown in FIG. 1B. When activated, as shown in FIGS. 9A & 9B, cylinder valve (209) redirects flow to the ram cylinders (206 and 206'), resulting in the movement of the movable roller (203) within the two slots (205) to a second position which sufficiently reduces the tension of the drive belt (212) to decrease significantly the transfer of kinetic energy from the drive belt (212) to the rollers (73), and the object (50) on the conveyor (101).

A drive chain-slip mechanism (300), shown in FIGS. 10 and 11, controls the drive chain (320) for the conveyor (101). To the framework (302) of drive chain-slip mechanism (300) is mounted two movable sprockets (303 and 303A). Each movable sprocket (303 and 303A) is attached to the end of an axle (340) to permit free rotation of the sprockets (303 & 303A). Through the other end of each axle (340) is transversely and slidably mounted to a common rod (340) with two ends. Each end of the common rod (304) is attached to a shaft cylinder (305 and 305'). A separate drive apparatus (306) controls the extension and retraction of the shaft cylinders (305 & 306), thus affecting the position of the common rod (304) and therefore the position of each axle (340) and thus the movable sprockets (303 & 303A).

As shown in FIG. 10 and FIG. 11, the drive apparatus (306) has a cylinder valve (307), flow lines (308), and flow control valves (309 and 309') attached to the sprocket-extending shaft cylinders (305 and 305'). A freely rotatable sprocket (310) is mounted on framework (302). A movable sprocket (311) is attached to cylinder (312) for controlling the drive chain (320) tension. Cylinder (312) is controlled by a separate drive apparatus (313) with a cylinder valve (314), flow lines (315) and flow control valves (316).

When the drive chain-slip device (300) is at its normal operating position, as shown in FIG. 10, shaft cylinders (305 & 305A) and cylinder (312) are at rest and do not interfere with the normal operation of the chain drive (320). The two sprockets (303 and 303A) movable within slots (320 & 320A) located in the frame (302) are out of contact with the drive chain (320). The two sprockets (303 and 303A), movable within slots (320 & 320A) located in the frame (302), are within the drive chain (320) perimeter, and the movable sprocket (311) is in position which allows the drive sprocket (317) to drive the drive chain (320), and thus the driven sprocket (318).

When the drive chain-slip device (300) is activated, as shown in FIG. 11, the cylinder valve (307) redirects flow to the sprocket-extending shaft cylinders (305 and 305A). The sprocket-extending shaft cylinders (305 and 305A) move from an initial rest position to second active position. In reaching the second, active position, cylinders (305 & 305a) move the common rod (304), thus moving the two sprockets (303 & 303A) within slots (320 & 320A) located in the frame (302) to a position engage the drive chain (320). At the same time cylinder valve (307) redirects flow to the sprocket-extending shaft cylinders (305 and 305A) and the sprocket-extending shaft cylinders (305 and 305A) move from an initial rest position to second active position, chain-tension cylinder valve (314) redirects flow to the chain-tension sprocket cylinder (312) and chain-tension sprocket cylinder (312) changes position of the movable sprocket (311) along a path in slot (319), as shown in FIGS. 10 & 11. Movement of the drive chain (320) by the two sprockets (303 & 303A) and movable sprocket (311) disengages the drive chain (320) away from a drive chain sprocket (317) in order to interrupt normal drive functioning of the drive chain (320), as shown in FIG. 11.

To resume normal functioning of the drive chain (320), sprocket-extending shaft cylinders (305 and 305A) and cylinder (312) return to their respective initial rest positions. As shown in FIGS. 10 & 11, the sprockets (303 & 303A) move within slots (320 & 320A) located in the frame (302) and return to a position within the perimeter of the drive chain (320).Simultaneously, chain tension sprocket (312) moves within slot (319) to the initial position.

The brake mechanism illustrated (500) in FIGS. 12 & 13 is an addition to elements of the belt slip mechanism (200) and drive slip mechanism (300) disclosed above. The brake mechanism (500) has a toothed rack (501) attached to the frame (202) of the belt-slip mechanism (200) and to the frame (302) of the drive chain mechanism (300). Ratchet arm (503) engages the teeth of toothed rack (501). Ratchet arm (503) is rotatably mounted in a housing (504) by a pin (505), which pin (505) is supported by the sides of housing (504). Housing (504) is mounted in the drive chain slip mechanism at the end of cylinder rod (305'and 305A') between the cylinder rod (305 & 305A) and frame (302), on which is mounted toothed rack (501). By locking into a toothed notch (507) of toothed rack (501), ratchet arm (503) thereby holds the position of cylinder rod (305'& 305A'). Ratchet arm (503) permits the moving of cylinder rod (305'and 305A') when ratchet arm (503) is pivoted on pin (505) within housing (504) by an electric solenoid (506), which electric solenoid (506) is attached at one end to the end ratchet arm (503) opposite the end which engages toothed rack (501) and at the other end to the housing (504) attached to the end of cylinder rod (305'& 305A'). Electric solenoid (506) is activated, thereby moving the ratchet arm (503) to permit the movement of the end of cylinder rod (305'& 305A'), when the control apparatus employed to extend or retract the cylinders (305 & 305A) is active.

In the belt slip mechanism (200), the brake mechanism is employed to lock the position of the extended cylinders (206) in place. Housing (504) is mounted in the belt slip mechanism at the end of each cylinder rod (206') between the cylinder rod (206) and frame (202), on which is mounted toothed rack (501). By locking into a toothed notch (507) of toothed rack (501), ratchet arm (503) thereby holds the position of cylinder rod (305'& 305A'). Ratchet arm (503) permits the moving of cylinder rod (206') when ratchet arm (503) is pivoted on pin (505) within housing (504) by an electric solenoid (506), which electric solenoid (506) is attached at one end to the end of the ratchet arm (503) opposing the end which engages toothed rack (501) and at the other end to the housing (504) attached to the end of cylinder rod (206'). Electric solenoid (506) is activated, thereby moving the ratchet arm (503) to permit the movement of the end of cylinder rod (206'), when the control apparatus employed to extend or retract the cylinders (206) is active.

The brake mechanism (500) is employed in the lift roller devices (100) to lock the position of the inner framework (105) in place. Housing (504) is mounted on the inner framework (105) between the inner framework (105) and outer framework (102). Toothed rack (501) is mounted to outer framework (102) to effect the locking into a toothed notch (507) of toothed rack (501). Ratchet arm (503) holds the position of cylinder rod (111') by securing the relative position of inner framework (105) to outer framework (102). Ratchet arm (503) permits the moving of the relative position of inner framework (105) and outer framework (102) when ratchet arm (503) is pivoted on pin (505) within housing (504) by an electric solenoid (506). Electric solenoid (506) is attached at one end to the end of the ratchet arm (503) opposite the end which engages toothed rack (501). The other end of electric solenoid (506) is attached to the housing (504). Electric solenoid (506) is activated, thereby moving the ratchet arm (503) to permit the movement of the inner framework (105), when the control apparatus employed to extend or retract the cylinder (111) is active.

A common malfunction on a conveyor (101) entails objects (50) on the conveyor snagging and accumulating at one area on the conveyor thus creating a jam. A mechanical failure on a conveyor can cause a jam as well. When a failure occurs, the system of this invention, by its sensors, activates itself or is activated by an operator. First, activation of the brake mechanisms (500) releases the cylinders (305, 305A & 206) from a locked position to permit movement of the cylinders. Activation of the belt-slip mechanism (200) disables the drive belt (212) from transferring kinetic energy from the drive belt (212) to the rollers (73). Activation of the drive chain-slip mechanism (300) disengages the drive chain (320) thus independently disabling the transfer of kinetic energy from the drive chain sprocket (317) (FIGS. 9 & 10) to the drive belt (212). Activation of the lift roller mechanism (100) lifts the object (50) to disengage the object (50) from the series of rollers (73). This elevation of the object (50) is desirable to free the object (50) from the snags, vibrations, or other objects (50) the object (50) experiences while travelling the series of rollers (73).

Next, an object (50) on the rollers (101), out of order or out of sequence is detected by electronic photocells (54 and 54'), which photocells (54 & 54') are connected to the drive apparatus (40) and double-solenoid pivot cylinder valve (16) activates and extends the pivot cylinder (15). Pivot cylinder (15) engages pivot yoke (17), and thus the rotating pipe (11), and thus the push arm assembly (9). Pivot cylinder (15) engages the rotating pipe pivot yoke (17), and consequentially, the collapsible arm (9) moves from an initial rest position, as shown in FIG. 1A, and falls toward the object (50). Box separator plate (626) engages the object (50). The object (50) is captured in between two collapsible arms (9). The pivot cylinder limit switch (14) is activated, sending a signal to the double-solenoid ram cylinder valve (12) which valve retracts the ram cylinder (51). Ram cylinder (51) engages the shaft (18) moving the push arm assembly (22) attached thereto along its horizontal axis (41) within the rotating pipe (11). Movement of the arm assembly (22) in contact with the object (50) moves the object (50) along the conveyor (101). The motion of the collapsible arm (9) is impeded by the presence of friction against the box (50) which resistance causes, first, the object or box (50) to move in the intended direction of travel along the conveyor (101) and, second, the r-shaped joint (27) to move along the box-pulling shaft (23). Shaft springs (30) maintain sufficient force against the r-shaped joint (27) during the box-pulling cycle to permit forward movement. The box (50) is moved from an initial blocked position to a second position.

Upon retraction of the ram cylinder (51), the ram cylinder limit switch (13) is engaged and the double-solenoid pivot cylinder valve (16) is activated. Being free from snags, vibrations, and other objects (50) the at least push arm mechanism (9) can reposition the object (50) on the conveyor (101) to alter and correct the course of the travel of the object (50) along the conveyor (101). The double solenoid pivot cylinder valve extends the pivot cylinder (15) and retracts the rotating pipe element (11). The pivot yoke (17) rotates the rotating pipe (11): both the shaft (18) and the push-arm assemblies (22 and 22') move along their longitudinal axis (31 and 41). The collapsible arms (9) rotate upward, away from the object (50) to the vertical position. Upon full extension of the of the pivot cylinder (15), the pivot cylinder limit switch (14) is activated sending a signal to the double-solenoid ram cylinder valve (12). The double-solenoid ram cylinder valve (12) valve actuates the ram cylinder (51), thus extending the shaft (18) and push-arm assembly (22). The extension of the box-pulling shaft (18) causes the r-shaped joints (27) to collide with rotating pipe stop bars (42 and 42'), and the collapsible arms (9) reset to the initial rest position. Then, the lift roller mechanism (100) lowers the object (50) onto the series of rollers (73). This lowering of the object (50) on the conveyor (101) is done after the course of the travel of the object (50) along the conveyor (101) has been corrected. The lift rollers are then deactivated as shown in FIGS. 5A & 5B. The belt-slip mechanism (200) is thereafter activated to engage the series of rollers (73) to resume the position of belt (212) to transfer kinetic energy to the series of rollers (73). Deactivation of the drive chain-slip mechanism (300) reengages the drive chain (320) and therefore the drive belt (212). Finally, the brake mechanisms (500) re-locks the cylinders (305, 305A & 206) from an unlocked position to secure the position of the cylinders (305, 305A & 206). The conveyor is thus returned to its initial operating position to move the object (50) to another position further down the conveyor (101).

I claim:

1. An apparatus for the movement of objects on rollers, the apparatus comprising:

a frame element;

a series of rollers, whereby the series of rollers are mounted in the frame element such that each roller in the series of rollers rotates within the frame element so that the objects resting on the series of rollers may travel from a first end of the series of rollers to a second terminal end of the series of rollers;

a rotating pipe element suspended over the series of rollers, which rotating pipe element pivots along a longitudinal axis and which rotating pipe element is driven at one end;

at least one push-arm assembly connected to the rotating pipe element; and, a drive apparatus to actuate the rotating pipe element, thereby moving the at least one push-arm assembly to a position in contact with at least one of the objects to move the at least one of the objects along the series of rollers.

2. An apparatus for the movement of objects on rollers as recited in claim 1, further comprising:
   a pivot yoke attached to the one end of the rotating pipe; and,
   a pivot cylinder integrated in a driving relationship with the pivot yoke wherein the drive apparatus drives the pivot cylinder and drives the pivot yoke to actuate the rotating pipe element, thereby moving the at least one push-arm assembly to a position in contact with at least one of the objects to move the at least one of the objects.

3. An apparatus for the movement of objects on rollers as recited in claim 1, wherein
   the at least one push-arm assembly comprises
      a collapsible arm attached to the rotating pipe element.

4. An apparatus for the movement of objects on rollers as recited in claim 1, wherein
   the at least one push-arm assembly comprises
      a spring-loaded element attached to the rotating pipe element, and
      a collapsible arm attached to a spring-loaded element.

5. An apparatus for the movement of objects on rollers as recited in claim 1, wherein
   the at least one push-arm assembly comprises
      a spring-loaded element attached to the rotating pipe element,
      a position-securing element being attached to the rotating pipe element, and
      a collapsible arm attached to the spring-loaded element and to the position-securing element.

6. An apparatus for the movement of objects on rollers as recited in claim 1, wherein
   the at least one push-arm assembly comprises
      a spring-loaded element attached to the rotating pipe element,
      a position-securing element being attached to the rotating pipe element, and
      a collapsible arm attached to the spring-loaded element and to the position-securing element the spring loaded element and the position securing element disposed within a protruding end of an r-shaped joint element, the r-shaped joint element attached to the rotating pipe element.

7. An apparatus for the movement of objects on rollers as recited in claim 1, wherein
   the at least one push-arm assembly comprises
      a collapsible arm with an end,
      an arm mount plate with a base, a first end, and a second end, where the first end of the arm mount plate is attached to the end of the collapsible arm, and where the base extends into and slides along a path parallel to the longitudinal axis of the rotating pipe element within the rotating pipe element,
      at least one gear with teeth which rotates on an axle, which axle is attached to second end of the arm mount plate, and
      a notched track with an end and a plurality of gear-teeth-receiving elements for engaging the teeth of the at least one gear and wherein the end of the track is attached to the rotating pipe element.

8. An apparatus for the movement of objects on rollers as recited in claim 1, further comprising
   a box-pulling shaft, with an end, contained within and attached to the rotating pipe element.

9. An apparatus for the movement of objects on rollers as recited in claim 8, wherein
   the at least one push-arm assembly comprises
      a spring-loaded element attached to the rotating pipe element,
      a position-securing element being attached to the rotating pipe element, and
      a collapsible arm attached to the spring-loaded element and to the position-securing element within the protruding end of an r-shaped joint element with collinear ends, wherein the collinear ends of the r-shaped joint element surround the box-pulling shaft.

10. An apparatus for the movement of objects on rollers as recited in claim 8, wherein
    the box-pulling shaft has a longitudinal axis collinear with the longitudinal axis of the rotating pipe element.

11. An apparatus for the movement of objects on rollers as recited in claim 8, wherein
    the box pulling shaft further comprises a steel collar attached to the end of the box-pulling shaft, the steel collar attachable to additional box-pulling shafts.

12. An apparatus for the movement of objects on rollers as recited in claim 1, wherein
    the drive apparatus includes
       a control apparatus, for regulating a flow of objects along the series of rollers.

13. An apparatus for the movement of objects on rollers as recited in claim 1, wherein
    the drive apparatus includes
       a ram cylinder attached to a union element attached to the box-pulling shaft.

14. An apparatus for the movement of objects on rollers as recited in claim 1, further comprising
    a generally planar outer framework attached to the frame element,
    an inner framework located inside the generally planar outer framework,
    at least one lift roller comprising
       an arm with at least one side, a top and a bottom, wherein the bottom of the arm is attached to the inner framework, and
       at least one wheel is attached to the top of the arm,
    at least one wedge-shaped roller lift cam, with a side and a base, the base of the at least one wedge-shaped roller lift cam attached to the generally planar outer framework,
    wherein the at least one side of the at least one lift roller slides along the side of the at least one wedge-shaped roller lift cam, and
    a drive apparatus to move the inner framework, thereby moving the at least one side of the at least one lift roller along the side of the at least one wedge-shaped roller lift cam so that the wheel located at the top of the at least one lift roller protrudes through the series of rollers to a position in contact with the at least one of the objects.

15. An apparatus for the movement of objects on rollers as recited in claim 14, further comprising
    a brake comprising
       a housing attached to the inner framework,
       a ratchet arm with a top, a bottom, and a pivot, rotatably mounted by the pivot within the housing,
       a toothed rack which lockingly engages the bottom of the ratchet arm and is attached to the generally planar outer framework,
       an apparatus attached to the top of the ratchet arm to move the ratchet arm around the pivot of the ratchet arm thereby moving the bottom of the ratchet arm from an initial position whereby the bottom of the ratchet arm lockingly engages the toothed rack to a second position whereby the bottom of the ratchet arm disengages the toothed rack.

16. An apparatus for the movement of objects on rollers as recited in claim 1, further comprising
a framework with a drive belt entrance, a drive belt exit, and at least one slot, the framework being attached to the frame element,
a drive belt, which engages the series of rollers and enters the framework through the drive belt entrance and exits the framework through the drive belt exit,
at least one roller mounted in the at least one slot, and
a drive apparatus with an end attached to the at least one roller to move the at least one roller along the at least one slot within the framework to engage the drive belt from an initial position whereby the drive belt drivingly engages the series of rollers to a second position whereby the drive belt does not drivingly engage the series of rollers.

17. An apparatus for the movement of objects on rollers as recited in claim 16, further comprising
a brake comprising
a housing attached to the end of the drive apparatus,
a ratchet arm with a top, a bottom, and a pivot, rotatably mounted by the pivot within the housing,
a toothed rack which lockingly engages the bottom of the ratchet arm and is attached to the generally planar outer framework,
an apparatus attached to the top of the ratchet arm to move the ratchet arm around the pivot of the ratchet arm thereby moving the bottom of the ratchet arm from an initial position whereby the bottom of the ratchet arm lockingly engages the toothed rack to a second position whereby the bottom of the ratchet arm disengages the toothed rack.

18. An apparatus for the movement of objects on rollers as recited in claim 1, further comprising
a roller drive, which engages the series of rollers,
a driven sprocket, which drives the roller drive,
a drive chain, which drives the driven sprocket,
a framework, with at least one slot and attached to the frame element, which houses the drive chain and the driven sprocket,
drive sprocket in driving communication with the drive chain,
at least one movable sprocket slidably mounted in the at least one slot, and
a drive apparatus with an end attached to the at least one movable sprocket to move the at least one movable sprocket along the at least one slot from an initial position whereby the drive chain drivingly engages the driven sprocket and does not engage the at least one movable sprocket to a second position whereby the at least one movable drive sprocket engages the drive chain and moves the drive chain out of contact with the driven sprocket so that the drive chain does not drivingly engage the driven sprocket.

19. An apparatus for the movement of objects on rollers as recited in claim 18, further comprising
a brake comprising
a housing attached to the end of the drive apparatus,
a ratchet arm with a top, a bottom, and a pivot, rotatably mounted by the pivot within the housing,
a toothed rack which lockingly engages the bottom of the ratchet arm and is attached to the generally planar outer framework,
an apparatus attached to the top of the ratchet arm to move the ratchet arm around the pivot of the ratchet arm thereby moving the bottom of the ratchet arm from an initial position whereby the bottom of the ratchet arm lockingly engages the toothed rack to a second position whereby the bottom of the ratchet arm disengages the toothed rack.

20. An apparatus for the movement of objects on rollers as recited in claim 1, wherein
the at least one of the objects is a plurality of objects.

21. An apparatus for the movement of objects on rollers, the apparatus comprising:
a frame element;
a series of rollers, whereby the series of rollers are mounted in the frame element such that each roller in the series of rollers rotates within the frame element so that the objects resting on the series of rollers may travel from a first end of the series of rollers to a second terminal end of the series of rollers;
a rotating pipe element with an end suspended over the series of rollers, which rotating pipe element pivots along a longitudinal axis and which rotating pipe element is driven at the end;
a pivot yoke attached to the end of the rotating pipe element;
a pivot cylinder integrated in a driving relationship with the pivot yoke;
a box-pulling shaft, with an end, contained within and attached to the rotating pipe element, the box pulling shaft having a longitudinal axis collinear with the longitudinal axis of the rotating pipe element, and the box pulling shaft further comprising
a steel collar attached to the end of the box-pulling shaft the steel collar attachable to additional box-pulling shafts;
at least one r-shaped joint element, attached to the box-pulling shaft, comprising
a protruding end and two collinear ends, whereby the two collinear ends of the r-shaped joint element surround the box-pulling shaft, and
one or more position-securing elements integrated into the protruding end of the r-shaped joint;
at least one push-arm assembly, connected to the protruding end of the r-shaped joint, comprising
a collapsible arm with an end,
a spring-load element with a first end and a second end, the first end of the spring-loaded element attached to the end of the collapsible arm and the second end of the spring-loaded element attached to the protruding end of the r-shaped joint by the one or more position-securing elements integrated into the protruding end of the r-shaped joint; and,
a drive apparatus attached to the pivot cylinder for driving the pivot yoke, which actuates the rotating pipe element and thereby moving the at least one push-arm assembly to a position in contact with the at least one of the objects to move the at least one of the objects along the series of rollers wherein
the drive apparatus including
a control apparatus, for regulating a flow of objects along the series of rollers, and
a ram cylinder which is attached to a union element attached to the box-pulling shaft.

22. An apparatus for the movement of objects on rollers, the apparatus comprising:
- a frame element;
- a series of rollers, whereby the series of rollers are mounted in the frame element such that each roller in the series of rollers rotates within the frame element so that the objects resting on the series of rollers may travel from a first end of the series of rollers to a second terminal end of the series of rollers;
- a rotating pipe element with an end suspended over the series of rollers, which rotating pipe element pivots along a longitudinal axis and which rotating pipe element is driven at the end;
- a pivot yoke attached to the end of the rotating pipe element;
- a pivot cylinder integrated in a driving relationship with the pivot yoke;
- a box-pulling shaft, with an end, contained within and attached to the rotating pipe element, the box pulling shaft having a longitudinal axis collinear with the longitudinal axis of the rotating pipe element, and the box pulling shaft further comprising
  - a steel collar attached to the end of the box-pulling shaft the steel collar attachable to additional box-pulling shafts;
- at least one r-shaped joint element, attached to the box-pulling shaft, comprising
  - a protruding end and two collinear ends, whereby the two collinear ends of the r-shaped joint element surround the box-pulling shaft, and
  - one or more position-securing elements integrated into the protruding end of the r-shaped joint;
- at least one push-arm assembly, connected to the protruding end of the r-shaped joint, comprising
  - a collapsible arm with an end,
  - a spring-load element with a first end and a second end, the first end of the spring-loaded element attached to the end of the collapsible arm and the second end of the spring-loaded element attached to the protruding end of the r-shaped joint by the one or more position-securing elements integrated into the protruding end of the r-shaped joint;
- a drive apparatus attached to the pivot cylinder for driving the pivot yoke, which actuates the rotating pipe element and thereby moving the at least one push-arm assembly to a position in contact with the at least one of the objects to move the at least one of the objects along the series of rollers wherein
  - the drive apparatus including
    - a control apparatus, for regulating a flow of objects along the series of rollers, and
    - a ram cylinder which is attached to a union element attached to the box-pulling shaft;
- a lift roller mechanism comprising
  - a generally planar outer framework attached to the frame element,
  - an inner framework located inside the generally planar outer framework,
  - at least one lift roller comprising
    - an arm with at least one side, a top and a bottom, wherein the bottom of the arm is attached to the inner framework, and
    - at least one wheel is attached to the top of the arm,
  - at least one wedge-shaped roller lift cam, with a side and a base, the base of at least one wedge-shaped roller lift cam attached to the generally planar outer framework, wherein the at least one side of the at least one lift roller slides along the side of the at least one wedge-shaped roller lift cam,
  - a drive apparatus to move the inner framework, thereby moving the at least one side of the at least one lift roller along the side of the at least one wedge-shaped roller lift cam so that the wheel located at the top of the at least one lift roller protrudes through the series of rollers to a position in contact with the at least one of the objects, and
  - a brake comprising
    - a housing attached to the inner framework,
    - a ratchet arm with a top, a bottom, and a pivot, rotatably mounted by the pivot within the housing,
    - a toothed rack which lockingly engages the bottom of the ratchet arm and is attached to the generally planar outer framework, and
    - an apparatus attached to the top of the ratchet arm to move the ratchet arm around the pivot of the ratchet arm and move the bottom of the ratchet arm from an initial position whereby the bottom of the ratchet arm lockingly engages the toothed rack to a second position whereby the bottom of the ratchet arm disengages the toothed rack;
- a belt-slip mechanism comprising
  - a framework with a drive belt entrance, a drive belt exit, and at least one slot, the framework being attached to the frame element,
  - a drive belt, which engages the series of rollers and enters the framework through the drive belt entrance and exits the framework through the drive belt exit,
  - at least one roller mounted in the at least one slot,
  - a drive apparatus with an end attached to the at least one roller to move the at least one roller along the at least one slot within the framework to engage the drive belt from an initial position whereby the drive belt drivingly engages the series of rollers to a second position whereby the drive belt does not drivingly engage the series of rollers, and
  - a brake comprising
    - a housing attached to the end of the drive apparatus,
    - a ratchet arm with a top, a bottom, and a pivot, rotatably mounted by the pivot within the housing,
    - a toothed rack which lockingly engages the bottom of the ratchet arm and is attached to the generally planar outer framework, and
    - an apparatus attached to the top of the ratchet arm to move the ratchet arm around the pivot of the ratchet arm and move the bottom of the ratchet arm from an initial position whereby the bottom of the ratchet arm lockingly engages the toothed rack to a second position whereby the bottom of the ratchet arm disengages the toothed rack; and,
- a chain-slip mechanism comprising
  - a roller drive, which engages the series of rollers,
  - a driven sprocket, which drives the roller drive,
  - a drive chain, which drives the driven sprocket,
  - a framework, with at least one slot and attached to the frame element, which houses the drive chain and the driven sprocket,
  - a drive sprocket in driving communication with the drive chain,
  - at least one movable sprocket slidably mounted in the at least one slot,
  - a drive apparatus with an end attached to the at least one movable sprocket to move the at least one movable sprocket along the at least one slot from an initial position whereby the drive chain drivingly engages the driven sprocket and does not engage the at least one movable sprocket to a second position whereby the at least one movable drive sprocket engages the drive chain and moves the drive chain out of contact with the driven sprocket so that the drive chain does not drivingly engage the driven sprocket, and a brake comprising a housing attached to the end of the drive apparatus, a ratchet arm with a top, a bottom, and a pivot, rotatably mounted by the pivot within the housing, a toothed rack which lockingly engages the bottom of the ratchet arm and is attached to the generally planar outer framework, and an apparatus attached to the top of the ratchet arm to move the ratchet arm around the pivot of the ratchet arm and move the bottom of the ratchet arm from an initial position whereby the bottom of the ratchet arm lockingly engages the toothed rack to a second position whereby the bottom of the ratchet arm disengages the toothed rack.

* * * * *